US006925641B1

(12) United States Patent
Elabd

(10) Patent No.: US 6,925,641 B1
(45) Date of Patent: Aug. 2, 2005

(54) REAL TIME DSP LOAD MANAGEMENT SYSTEM

(75) Inventor: Hammam Elabd, Sunnyvale, CA (US)

(73) Assignee: Xronix Communications, Inc., Mountain View, CA (US)

( * ) Notice: Subject to any disclaimer, the term of this patent is extended or adjusted under 35 U.S.C. 154(b) by 0 days.

(21) Appl. No.: 09/498,525

(22) Filed: Feb. 4, 2000

(51) Int. Cl.[7] .............................................. G06F 9/46
(52) U.S. Cl. ...................... 718/101; 718/100; 718/105; 710/1; 711/100; 712/1
(58) Field of Search ............................... 704/104, 102, 704/100; 711/206, 147, 100; 760/52; 345/503; 718/100, 101, 105; 710/1; 712/1

(56) References Cited

U.S. PATENT DOCUMENTS

| 5,440,740 | A | | 8/1995 | Chen et al. | |
|---|---|---|---|---|---|
| 5,630,132 | A | * | 5/1997 | Allran et al. | 709/100 |
| 5,724,587 | A | * | 3/1998 | Carmon et al. | 709/104 |
| 5,771,232 | A | * | 6/1998 | Sinibaldi et al. | 370/384 |
| 5,842,014 | A | | 11/1998 | Brooks et al. | |
| 6,009,507 | A | * | 12/1999 | Brooks et al. | 712/28 |
| 6,044,225 | A | * | 3/2000 | Spencer et al. | 710/52 |
| 6,179,489 | B1 | * | 1/2001 | So et al. | 709/102 |
| 6,278,707 | B1 | * | 8/2001 | MacMillan et al. | 370/352 |
| 6,320,867 | B1 | * | 11/2001 | Bellenger et al. | 370/420 |
| 6,342,892 | B1 | * | 1/2002 | Van Hook et al. | 345/503 |
| 6,463,481 | B1 | * | 10/2002 | Lupien et al. | 710/22 |
| 6,526,462 | B1 | * | 2/2003 | Elabd | 710/242 |
| 6,535,958 | B1 | * | 3/2003 | Fuoco et al. | 711/122 |
| 2001/0043614 | A1 | * | 11/2001 | Viswanadham et al. | 370/469 |
| 2001/0052056 | A1 | * | 12/2001 | Acton et al. | 711/147 |
| 2002/0078319 | A1 | * | 6/2002 | Chauvel et al. | 711/206 |
| 2003/0142664 | A1 | * | 7/2003 | Gerszberg et al. | 370/354 |

FOREIGN PATENT DOCUMENTS

EP        0 329 151        8/1989

* cited by examiner

Primary Examiner—Meng-Al T. An
Assistant Examiner—Lilian Vo
(74) Attorney, Agent, or Firm—Pillsbury Winthrop et al.

(57) ABSTRACT

A highly intelligent DSP load management system is described herein for enhancing the processing capabilities of an SOC device. The DSP load management system enables parallel processing of data at high frequency and distributes, reads and writes data to several CPUs and/or DSPs in the same clock cycle. In addition, the DSP load management system provides forward looking real-time evaluation of arriving data and diverts tasks from one DSP to another, with short or zero latency. The DSP load management system is interfaced between one or more CPUs, one or more DSPs and/or a memory management system for enabling parallel processing of data at high frequency.

11 Claims, 25 Drawing Sheets

FIG. 6Bii

REAL TIME DSP LOAD MANAGEMENT SYSTEM

FIELD OF THE INVENTION

The present invention relates to a DSP load management system, and more particularly, to a system and method for enhancing the processing capabilities of a system on chip (SOC) device. The DSP load management system of the present invention enables parallel processing of data at high frequency. The present invention is further directed to a system and method for distributing, reading and writing data to several CPUs and/or DSPs simultaneously or in the same clock cycle. In addition, the DSP load management system provides forward-looking real-time evaluation of arriving data and an algorithm to optimizing loading for multiple DSPs before, during, and after algorithm switching operations.

BACKGROUND OF THE INVENTION

An SOC device has many advantages and benefits over a separate component integrated circuit (IC) device. For example, the separate IC device generally includes components that are connected to each other on a printed circuit board, whereas the SOC device includes an entire system (processors, memory, logic, clock, I/O control unit, etc.) embedded on a single chip, thereby producing a device that is smaller, faster, and more efficient. Furthermore, the overall size of the end product is reduced using the SOC device because manufacturers can put major system functions on a single chip, as opposed to putting them on multiple chips. As is well known, the SOC device has at least an embedded processor (e.g., ARM, LEXRA, MIPS, ARC, DSP core), memory, and logic.

The SOC device also provides faster chip speeds due to the integration of the components/functions into a single chip. Many applications such as high-speed communication products (VoIP, MoIP, wireless, imaging) require chip speeds that may be unattainable with separate IC components. This is primarily due to the physical limitations of moving data from one chip to another, through bonding pads, wires, buses, etc. Integrating components/functions into one chip eliminates the need to physically move data from one chip to another, thereby producing faster chip speeds. Further, the SOC device consumes less power than the separate IC device since data do not need to be moved from one chip to another. Another advantage of using the SOC device is that it is less expensive for the manufacturer because of the reduced number of chips used in the end product. Packaging costs, which can be significant, are likewise reduced as a result of having fewer chips. Thus, SOC devices are becoming ever more popular and are widely used in many applications requiring fast/high data rates as in the Internet/imaging applications.

However, one major shortcoming associated with the SOC device is that there may be multiple DSPs (digital signal processor) on a single chip, which requires one or more CPUs to process data at a very high rate. As a consequence, the one or more CPUs may not be able to efficiently perform general system/application tasks since each request from the DSPs consumes tens or hundreds of CPU clock cycles.

Typically, a 16 bit DSP array can handle two DSP words, 16 bit each at/during one clock cycle during operation and, thus, corresponding memories such as SDRAMs will likewise have 16 bit wide buses. It is also known that on a single board, performance speeds of greater than 100 MHz is quite difficult to achieve for DSPs with 16 bit capabilities. As a result, a 100 MHz bus is generally implemented between the DSPs and memories.

To further illustrate the shortcoming of the prior art system, assume that a burst operation is performed, which requires 12 cycles (120 nanoseconds) to read 8×16-bit words. Assume also that the capability of each memory access controller (MAC) is about 133 MB/sec under the most ideal condition during the burst operation, without reading a single word. As known, the CPU other operations (system, periphery devices, etc.) generally require at least 80 MB/sec or more. This means that the CPU cannot perform all the functions for the multiple DSPs and MACs. For example, it is known that there are no less than 60 MB/sec for DSP operations. Thus, multiple threads between the CPU and the DSPs are needed to operate an efficient overall system.

In general, the number of DSPs required in an application is a function of the input sample rate, algorithm MIPS (million instructions per second), number of different algorithms employed, memory access overheads (i.e., arbitration, latency), I/O data distribution overheads (input/output data), and time skew. Thus, the total throughput on the DSPs is a function of their workloads and overheads. Further, the workload distribution is a function of the present and new loads along with the present and new algorithms that may be implemented in the future.

One design option for implementing the SOC device with multiple DSPs is to provide individual embedded memory for each DSP. This method, however, requires a great deal of memory space and is often very costly and inefficient when implemented using a conventional CMOS logic process. Alternatively, it can be implemented using an embedded DRAM process, but this process is also very costly. One advantage of the SOC approach is that circuitry that is on a board can be implemented on a single chip, thereby reducing AC power dissipation of memory access controllers as a result of integrating more memory on the chip.

As is well known, an embeddable DSP is presently operational in the range of 125–180 MHz. However, there are many systems that are currently being designed that are operational in the 800 MHz to 2 GOPS/s range. Embeddable DSPs with 800 MHz to 2 GOPPS/s clocks are currently not available for such systems. To provide the functional equivalence for the above system, the first design option is to design a system with multiple DSPs connected in a network (i.e., seal gate for image processing). The second design option is to use combination of multiple programmable DSPs and processing element DSP array networked together by a DSP load management system for efficient implementation of multiple DSP algorithms. The present invention is implemented using the second design option.

FIG. 1 illustrates a simplified block diagram of a conventional SOC device having a CPU 2 and multiple DSPs 12*a*, 12*b*, 12*c*. Two separate chips are required in this device, one for the CPU 2, and one for the DSPs 12*a*, 12*b*, 12*c* and their program and data memories (shown in FIG. 2). Only one CPU 2 and three DSPs 12*a*, 12*b*, 12*c* are illustrated herein, but it is understood that more than one CPU and more or less than three DSPs, or other kinds of processors can be used. The CPU 2 includes a cache 4, which may be internal or external, as known in the art. Other conventional components, which are not illustrated herein, may also be connected/coupled to the CPU 2 and DSPs 12*a*, 12*b*, 12*c*.

Also included in the diagram of FIG. 1 is data1 20*a*, data2 20*b*, and data3 20*c*, which data is associated with an outside communication port. Data1 20a, data2 20b, and data3 20c can be data originating from a telephone (voice), fax, modem or combinations thereof. When the CPU 2 fetches the data from the communication port, data from data1 20a, data2 20b, and data3 20c are broken up and buffered in the CPU cache 4. The buffered data 6a, 6b, . . . 6n, is transmitted to the appropriate DSP 12a, 12b, 12c, based on intelligent software decisions made by the CPU 2. For example, during each clock cycle, a particular data (e.g., 6a) originating from data1 20a in the cache 4 can be sent to DSP 12a, and data 6b originating from data2 20b in the cache 4 can be sent to DSP 12c. Transmitting a predetermined number of data from the cache 4 to the DSPs 12a, 12b, 12c, works well as long as the CPU 2 does not have to perform other functions and the data is slow (i.e., 1 or 2 mega-bits source). However, this schema will fail if the data is fast (i.e., imaging, fast communication ports such as T3 45 Mbps, etc.) and when the CPU 2 has to perform other application or system functions or when arbitration the memory reduces data throughput.

FIG. 2 illustrates a block diagram illustrating the SOC device of FIG. 1 having the CPU 2 and multiple DSPs 12a, 12b, 12c, where the CPU 2 is transmitting data to the multiple DSPs 12a, 12b, 12c. As shown, DSP1 12a communicates with DSP program and data memory 22a, which memory is designated for only DSP1 12a. Likewise, DSP2 12b communicates with its designated program and data memory 22b, and DSP3 12c communicates with its designated program and data memory 22c. In this example, DSP1 12a, DSP2 12b, and DSP3 12c are assumed to have program and data memory and tables in their memories 22a, 22b, 22c. When data buffered in the CPU cache 4 corresponds to algorithm 3 running in the DSP3 12c, then data is sent to the DSP3 12c for processing since the program and data memory 22c includes a program for algorithm 3. On the other hand, when data buffered in the CPU cache 4 corresponds to algorithm 1, 2, it is sent to either/both DSP1 12a or DSP2 12b since program and data memories 22a, 22b include algorithms 1, 2. After the data is processed by the DSPs 12a, 12b, 12c, the processed data can be transmitted to an external source.

When the contents of the program and data memory needs to be switched, one or more of the program and data memories 22a, 22b, 22c will be flushed or cleared out so that new memory can be loaded therein. New data and/or program tables are retrieved from external memory and loaded into one or more memories 22a, 22b, 22c. As illustrated, each DSP1 12a, DSP2 12b, DSP3 12c also communicates with its corresponding external memory. This process is a major undertaking since it is very time consuming, as the CPU 2 attempts to read from external memory and load DSP program and data tables in the program and data memories 22a, 22b, 22c.

As can be appreciated, the conventional system is very limiting since switching algorithms can be time-consuming. In addition, the conventional system is designed to only handle data with very slow rates. Accordingly, there is a need for a DSP load management system (DLMS) that works simultaneously in conjunction with the CPU(s), DSPs, memory, and memory management system to provide efficient switching and handling of data with high rates and efficient loading or switching of algorithms and data tables into DSP memories.

SUMMARY OF THE INVENTION

It is an object of the present invention to provide a DSP load management system that enhances the processing capabilities of an SOC device.

It is another object of the present invention to provide a DSP load management system that enables parallel processing of data at high frequency from shared memory.

It is still another object of the present invention to provide a DSP load management system that distributes, reads and writes data to several CPUs and/or DSPs in the same clock cycle.

It is another object of the present invention to provide a DSP load management system that includes information relating to the internal characteristics of an DSP array.

It is a further object of the present invention to provide a DSP load management system that requests multiple bursts from a memory access controller via multi-threaded memories.

It is another object of the present invention to provide a DSP load management system that diverts tasks from one DSP to another, with short or zero latency.

It is still a further object of the present invention to provide a DSP load management system that optimizes dynamic algorithm switching in real time.

It is another object of the present invention to provide a DSP load management system that loads algorithms and data tables in DSP memories in real time.

It is yet another object of the present invention to provide an intelligent DSP load management system that allows the CPU to perform system control and application tasks without the CPU having to perform word by word data loading and instruction by instruction switching functions.

It is another object of the present invention to provide a system and method for dynamically loading data in multiple DSPs based on real-time processing capabilities of the multiple DSPs.

It is a further object of the present invention to provide a system and method of representing a DSP array as a single DSP system with a wide bus.

It is yet another object of the present invention to provide a system and method for threading a data stream from one processor to another.

It is yet another object of the present invention to provide a system and method having hardware and software functionalities for managing the load of an DSP array.

It is a further object of the present invention to provide programmable DSPs and networking them together for efficiency.

It is another object of the present invention to provide a system and method having hardware and software functionalities for optimizing IP packet delay and for increasing quality of service based on the type of service and priority.

It is yet another object of the present invention to provide a system and method for allowing the DSP load management system to interface between one or more CPUs and one or more DSPs.

It is yet a further object of the present invention to provide a system and method providing forward looking real time evaluation of arriving data.

These and other objects of the present invention are obtained by providing a DSP load management system that enhances the processing capabilities of an SOC device. The DSP load management system can be interfaced between one or more CPUs, one or more DSPs, and/or a memory management system or memory access controllers for enabling parallel processing of data at high frequency and loading and switching DSP programs without causing arbitration conflicts on the memory access bus. Data can be distributed, and read/write to several CPUs and/or DSPs in the same clock cycle. In addition, the DSP load management system provides forward-looking real-time evaluation of arriving data. The present invention also provides a system and method for distributing and re-distributing loads between several DSPs.

BRIEF DESCRIPTION OF THE DRAWINGS

These and other objects and advantages of the present invention will become apparent and more readily appreciated from the following detailed description of the presently preferred exemplary embodiments of the invention taken in conjunction with the accompanying drawings, of which.

DETAILED DESCRIPTION OF THE PREFERRED EMBODIMENTS

Figure 1:
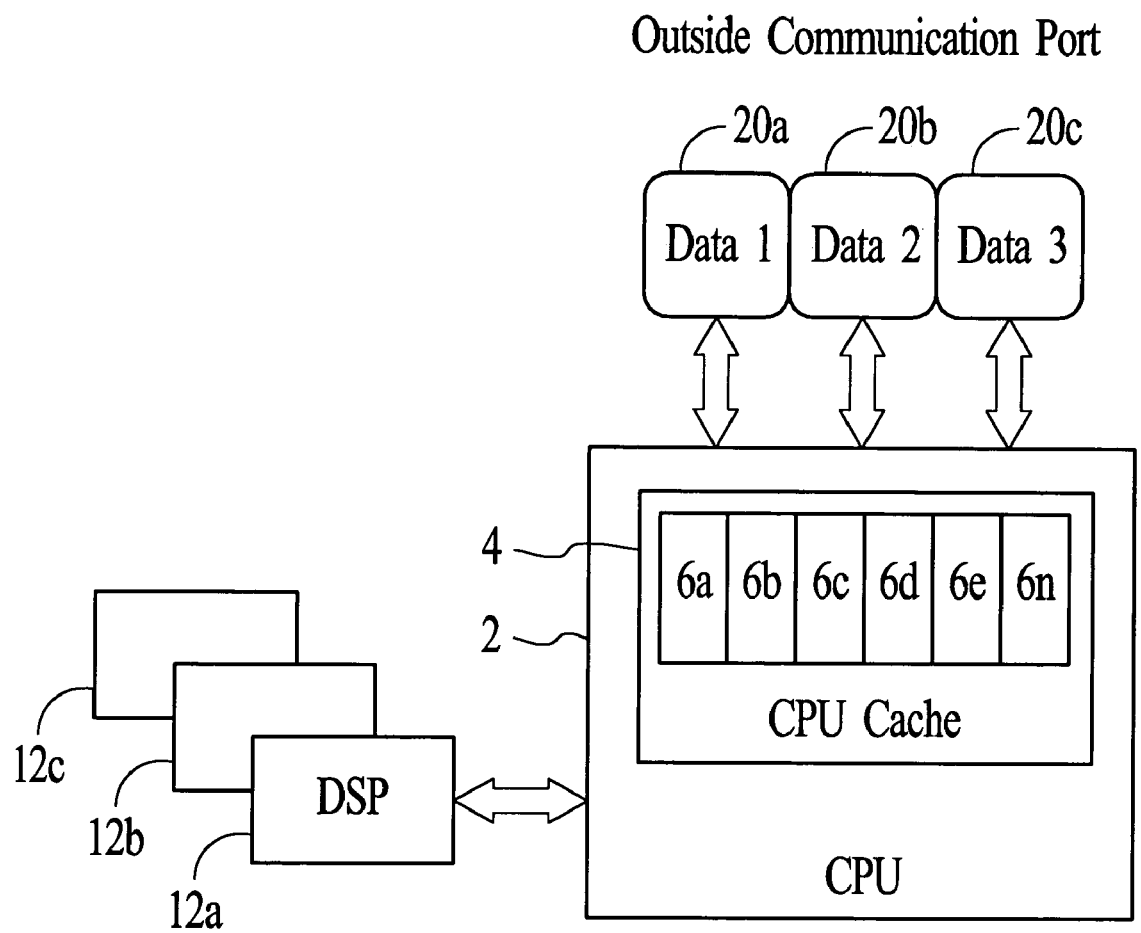
FIG. 1 illustrates a block diagram of a conventional SOC device having a CPU and several DSPs.
Figure 2:
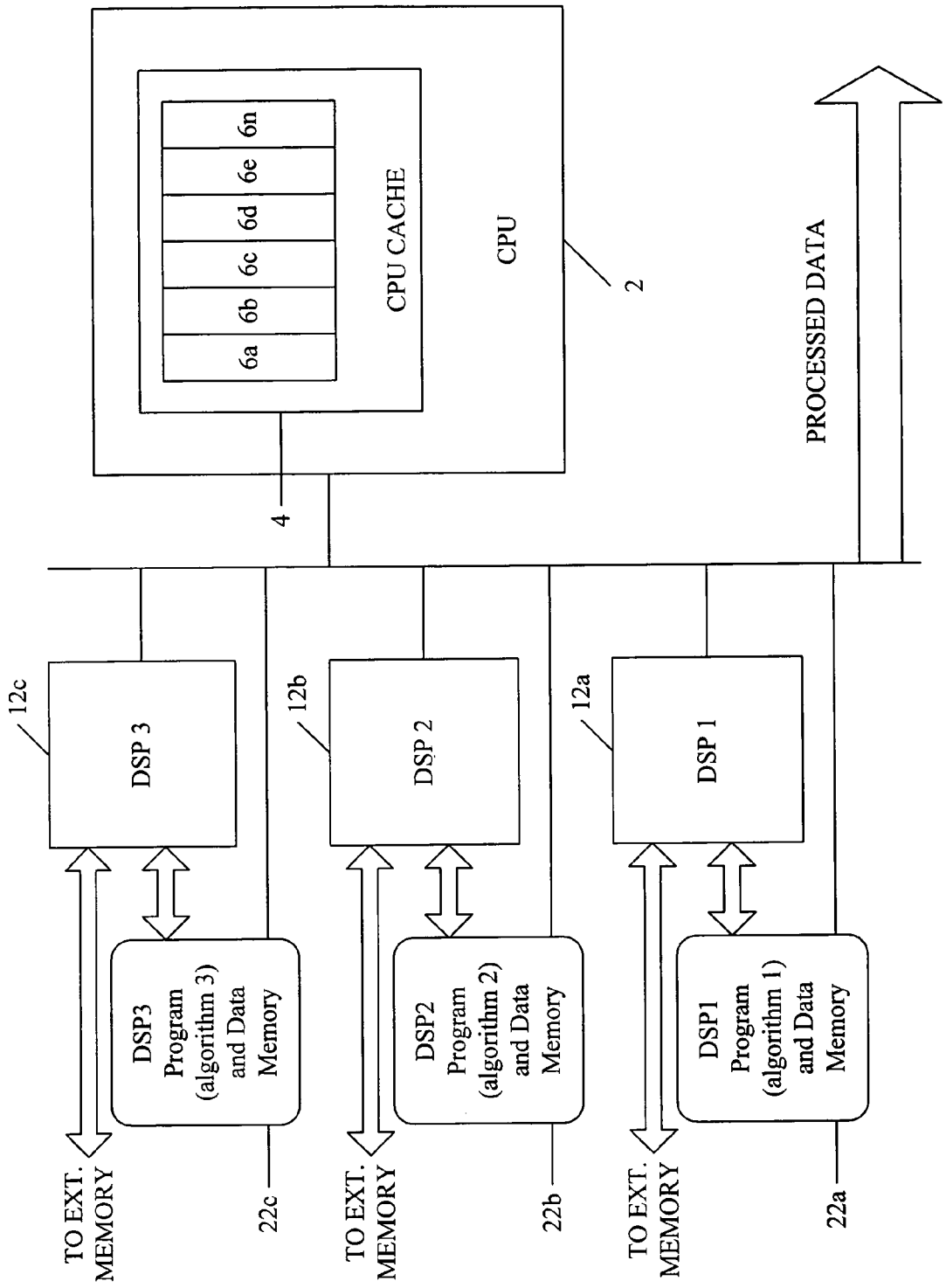
FIG. 2 illustrates a block diagram illustrating a SOC device of FIG. 1 having a CPU transmitting data to several DSPs.

The present invention will be described in greater detail, which may serve to further the understanding of the preferred embodiments of the present invention. As described elsewhere herein, various refinements and substitutions of the various embodiments are possible based on the principles and teachings herein.

The preferred embodiments of the present invention will now be described with reference to FIGS. 3–18, wherein like components and steps are designated by like reference numerals throughout the various figures. Further, specific parameters such as algorithms, loads, speeds, data rates, and the like are provided herein, and are intended to be explanatory rather than limiting.

The present invention relates to a system and method that combines hardware and software functionalities to provide a DSP load management system (DLMS). The present invention allows a single chip to include one or more CPUs, a DLMS layer, and multiple DSPs. Each DSP can access an external memory and an internal memory via its designated thread, as described in more detail below. The DLMS converts low power processing DSPs to high power processing DSPs. One or more CPUs can look up status tables/registers in the DLMS to obtain real time status of the multiple DSPs. This allows the CPU to determine which DSP is loading/processing what load and/or algorithm at any give time/cycle.

The present invention also provides inter-transaction, intra-transaction, and hardware mapping optimization schemes. In inter-transaction optimization, new calls are given to the least loaded DSP on frame boundaries, while in intra-transaction optimization, 2 or more algorithms can be switched on the same DSP during transaction time. In the hardware mapping optimization, same calls/samples are threaded between several DSPs during one frame time. These optimization schemes are discussed in greater detail hereinafter.

In general, the DLMS of the present invention can include the following functional components, which are described in greater detail later herein: (1) multiple direct memory access (DMA) to memory system with internal DMA registers; (2) interface to the CPU (coprocessor interface—CI); (3) interface to DSP array; (4) interface to multi-threaded memory management system; (4) interface to DSP internal data and control registers; (5) interface to internal DSP program/data memory and ping-pong memory; (6) status and control registers; (7) FIFOs and state machines (SM); (8) MUXs and registers for simultaneous parallel transfer of data from one DSP to another; and (9) CPU instruction decoder to decode custom CPU instructions and generate multiple threading operations from the CPU instructions.

The DLMS also provides buffer memory for data transfers between multiple processors (CPUs, DSPs, etc) (i.e., registers to read out data from one processor and write to another processor). This can be accomplished by providing parallel word exchange between one or more DSPs and between one or more DSPs and memory (multi-threaded exchange).

In addition, the DLMS includes a decoder that is capable of decoding CPU instructions that require parallel data word transfers between DSPs and between DSPs and memories. The CPU instructions can be as simple as writing a bit to a control register or as complex as decoding a real-time instruction operation code. The DLMS can be configured to enhance instructions as well as data parallelism in the parallel DSP system. To enhance instruction parallelism, the DLMS transfers certain operations to the parallel processor array, e.g. 100 small processing elements, having identical or different processing elements that can be implemented with only a few instructions. In this manner, the DLMS and the CPU will need to recognize sections of the algorithms that are similar in nature so that they can be processed in parallel. Further, the DLMS control registers are capable of reconfiguring the parallel function of the DSP array, i.e., via mode register.

The DLMS can also be considered as a load manager for a communication SOC that is used for complex processing of multi-channel, multi-service systems. The communication SOC can handle multi-channel, multi-protocol, and multi-service voice/fax/data with multiple digital signal conditioning/modulation (DSP) algorithms and multiple packet and cell processing protocols using multi-channel voice compression and multi-protocol packet and cell processing. The communication SOC integrates application-specific software such as TCP/IP protocol stacks or ATM SAR (segmentation and re-assembly) functions that are optimized for 16-and 32-bit data-streaming applications.

When the DLMS functions as the load manager, it divides the load between DSP cores such as Carmel DSP from Infinion and individual SOC processing elements such as a multiply and accumulate. As known, 16×16 or 32×32 bit MACs are usually available on the SOC as a part of the CPU core. These MACs can then be used as a substitute for an additional DSP core in algorithm implementation, where the interface between the DSP cores and the CPU-MAC includes the DLMS registers.

Figure 3A:
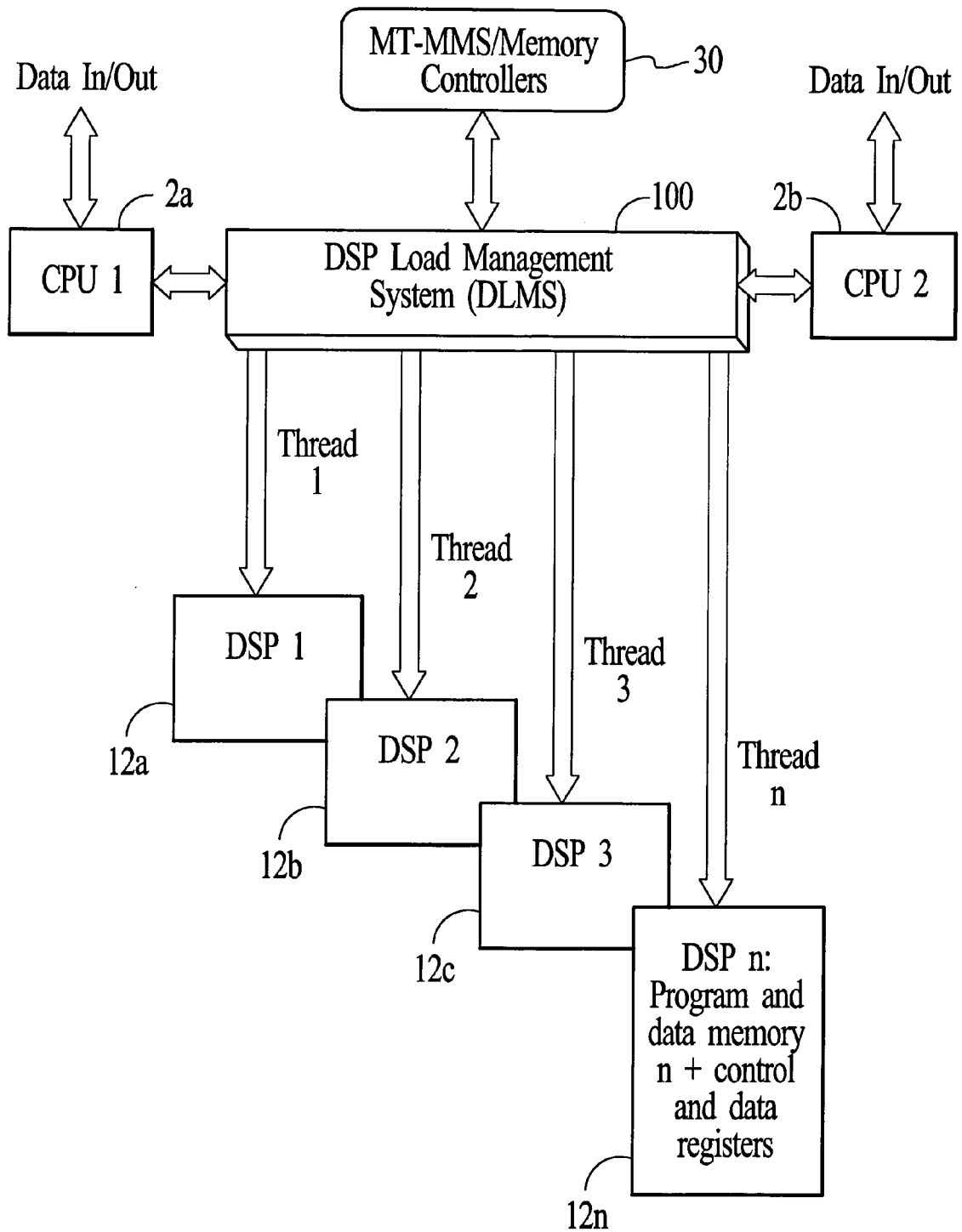
FIG. 3A illustrates a block diagram of an SOC device having a DSP load management system in accordance with the preferred embodiment of the present invention.

FIG. 3A illustrates a block diagram of an SOC device having a DSP load management system (DLMS) in accordance with the preferred embodiment of the present invention. The DLMS described herein is an intelligent device on the SOC device that manages the DSPs, CPUs, other processors, and memory management systems.

The DLMS 100 is interfaced between one or more CPUs 2a, 2b, and one or more DSPs 12a, 12b, 12c, 12n. The DLMS 100 also communicates with a multi-tasking memory management system (MT MMS) or memory access controllers (MAC) 30 that is controlled by one or more CPUs, as described in the co-pending U.S. application Ser. No. 09/443,934, entitled "Multi-Tasking Memory Management System", the contents of which are expressly incorporated herein by reference.

The DLMS 100 can be disabled (made non-active) via software commands, which allows the CPUs 2a, 2b to communicate with the DSPs 12a, 12b, 12c, 12n as in the conventional manner. However, the DLMS 100 can be activated in order to allow the overall system to become more efficient. The DLMS 100 can (1) process on a transaction boundary basis or (2) optimize loads within a transaction, as described in more detail hereinafter. The DLMS 100 can also be programmed by one or more CPUs 2a, 2b via control registers to access memory through the MT MMS 30 using multiple threads. Each DSP 12a, 12b, 12c, 12n, includes a program/data memory and control/data registers.

Figure 3B:
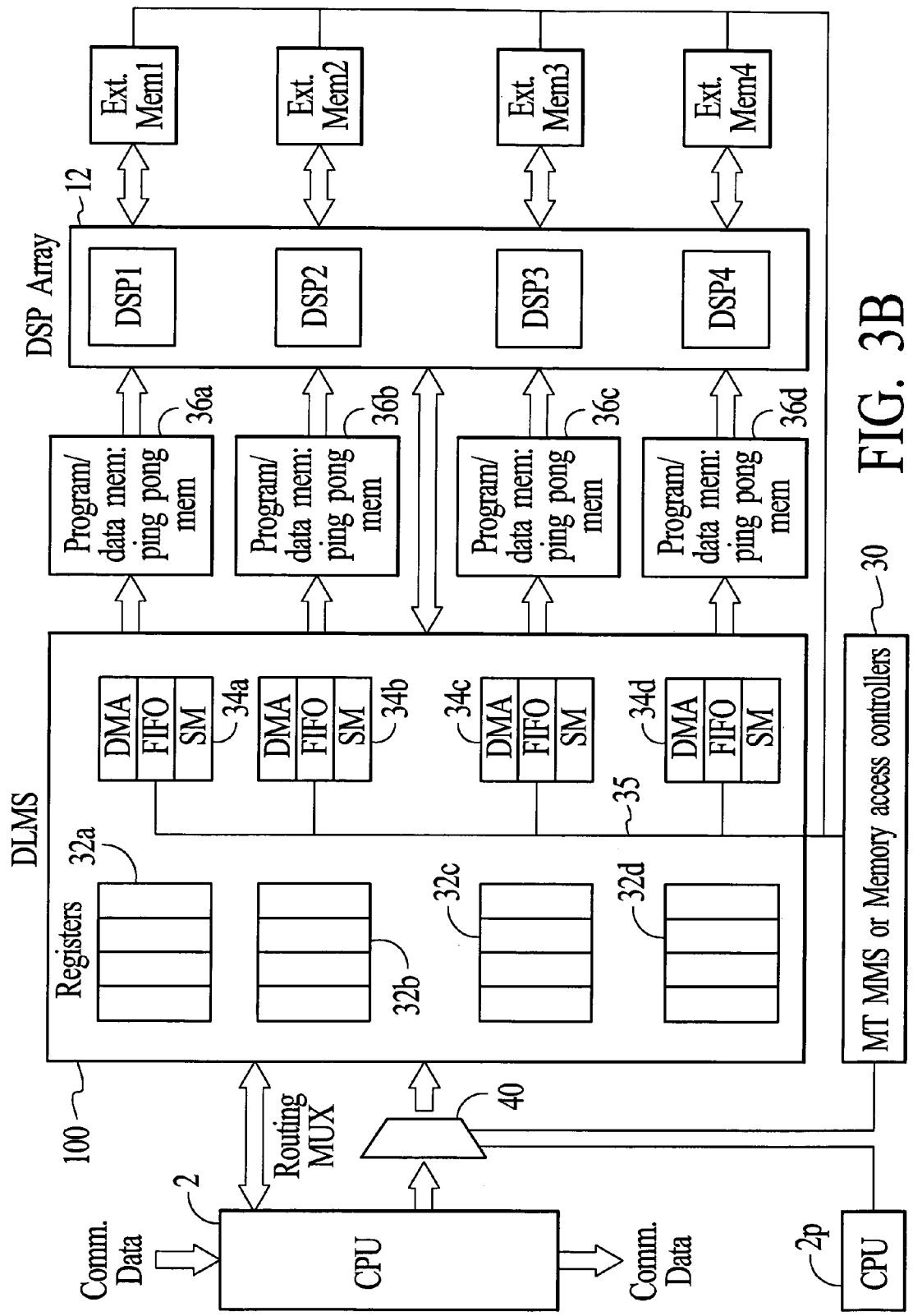
FIG. 3B illustrates a detailed block diagram of an SOC device having a DSP load management system in accordance with the preferred embodiment of the present invention.

FIG. 3B illustrates a detailed block diagram of an SOC device having a DLMS in accordance with the preferred embodiment of the present invention. Each of the DSP 1, DSP2, DSP3, DSP4 in the DSP array 12 has access to its own separate or semi-separate external memory Ext MEM1, Ext MEM2, Ext MEM3, and Ext MEM4, respectively. There are also program and data and "ping-pong" memories 36a, 36b, 36c, 36d for the DSP1, DSP2, DSP3, and DSP4, respectively. The ping-pong memories are essentially on-chip buffer memory filled by DMA from an external memory. This type of architecture prevents multiple DSPs from competing with each other for access to the memory bus by way of providing multi-treaded memories. For example, the CPU 2 can essentially write to one section of the internal memories 36a, 36b, 36c, 36d (i.e., SRAMs having 1–6 transistors each) in the program/data memories, while another section of the internal memories can be essentially read by the DSPs via the ping-pong memories.

In greater detail, the DLMS 100 includes multiple registers 32a, 32b, 32c, 32d, and multiple DMAs 34a, 34b, 34c, 34d, which include state machines (SM) (i.e., logic) and FIFOs (typically 32 bits). During operation, the CPU 2 using appropriate software can write in the DLMS registers 32a, 32b, 32c, 32d the beginning address and length of data, which the DMAs 34a, 34b, 34c, 34d need to retrieve. The DMAs 34a, 34b, 34c, 34d then establish a request via the MT MMS or MACs 30 to read the beginning address and length of data. There can be one MT MMS or four memory access controllers 30, as shown. The DMAs 34a, 34b, 34c, 34d can also provide read/write bursts to both internal and external memories via the bus 35 on the chip and can read data/instructions from the CPU 2 cache.

The state machine (SM) can initiate the transfer of data between the FIFO and the ping-pong memory in the DSP subsystem. In this manner, the FIFO can be filled and emptied continuously in a simultaneous manner.

During operation, a communication device sends communication data to the CPU 2. The CPU 2 then writes the data to the appropriate register in the DLMS 100 depending on which DSP is to perform the task. Status tables in the DLMS 100 can be used by the CPU 2 to keep track of which DSP is performing/processing what task and algorithm. At any point during the frame, the DLMS 100 can inform the CPU of the status. Instead of the CPU 2 doing all the processing, the DLMS 100 creates a status table of all the DSPs' conditions such as "finished processing", loading, etc. This assists the CPU 2 using, for example, a routing MUX 40 to determine into which register the next set of data should be written. While the DSPs are processing the data in the background, the CPU 2 and the DLMS 100 are preparing the processing of the next data/algorithm. The routing MUX 40 is also coupled to the MT MMS or MACs 30, and may be coupled to a second CPU 2p.

The CPU 2 can look up the status table in the DLMS 100 to determine where to send the next set of data or the routing MUX can perform the task for the CPU 2. Each piece of data in the register is preferably a TDM (time division multiplex) call or PCM (pulse coded modulated) call. After processing the data using the DSPs, the data is preferably compressed to Internet packets and transmitted back to the CPU and then to an IP communication device.

The DMAs 34a, 34b, 34c, 34d in conjunction with the memory access controllers/MT MMS 30 and the CPU 2 transfers data between external memories and the FIFOs in DMA. The arbitration for the memory bus is done by an arbiter in the MAC or MT MMS 30. The DLMS 100 preferably includes at least the same number of DMAs 34a, 34b, 34c, 34d as the number of processors, DSPs. The selection of control status registers (CSR) for each DMA 34a, 34b, 34c, 34d is done by address decoding. The address range for each block is hardwired in the CSR register address decoder. The DLMS 100 accepts data either from the CPU 2, which writes into the DSP general or control registers or from the MT MMS 30 by transferring the data from the various DMA FIFOs to the ping pong program and data memories.

Each DMA FIFO has a finite size of, for example, 32 words. When it is filled below a minimum threshold value, a request is sent to the memory bus for more data. On the other hand, when it is filled above a certain maximum threshold value to avoid FIFO overflow, it will terminate data transfer from the memory to it. There are both read and write FIFOs for each DMA interface.

Memory to DMA FIFO can be initiated by writing a non-zero value into data available (ready to read) register. The address from which data has to be transferred is specified by writing into the DMA address register. DMA to DSP program/data memory transfer (i.e., from DMA FIFO to DSP memory) is performed by the DMA signaling to the DLMS 100 that there is a new algorithm available by setting the send request signal. The DLMS 100 will then generate strobe signal to read the data from the DMA FIFO to the DSP program or data memory. The DLMS 100 also will generate the appropriate memory address to store the new algorithm in the DSP program memory and generate an interrupt signal once all the FIFO contents are sent to the DSP. The process will be repeated until all the new algorithm is written into the DSP program memory. At the end of the present data frame, the DLMS 100 will send a signal to the DSP to switch from the first field to the second of the program/data memory and ping-pong memory 36a, 36b, 36c, 36d.

In further detail, the CPU 2 can receive high frequency serial data from one or more communication cores/systems such as VoIP (voice over IP), FoP (fax over IP), IP to sonet, Read-Solomon, encoding, decoding, satellite receiver, broadband communication, image processing, data modem, and the like. The CPU 2 then compiles this data into frames of, for example, frame 1 covering the period between 0 to 10 msec, frame 2 covering the period between 10 to 20 msec, etc. These frames are then sent one at a time to one or more DSPs in the DSP array 12 using the DLMS 100. The DLMS 100 cooperates with the CPU 2 to distribute sections of the frames to different DSPs based on a load management algorithm programmed in the CPU 2 and the DLMS state machines. Between each frame period or during the frame processing period, the DLMS 100 receives a change of frame early warning signal from the CPU 2 based on new data. The CPU 2 then sends a beginning memory address and block length information to the DLMS 100, which information is written into its DMA registers. The DMA then requests to several MACs or MT MMS 30 to retrieve new algorithms from external memory, if needed. The data and algorithms are then written into the DMA FIFO and then transferred by the DLMS state machines into the ping-pong memory via the DSP program/data memory. The data and programs are loaded in the same clock cycle into multiple memories or registers. The DMA burst transactions continue until all the algorithm/data is read. The CPU 2 can also write to control registers of the DLMS 100 to achieve synchronous or parallel DMA operations while reading the status registers, thereby saving itself instruction cycles.

The advantage of this invention is that external memory is used instead of internal memory on the chip. Manufacturing costs can be reduced as a result since embedded DRAM is not used. This invention also allows data to be threaded between DSPs at frame boundaries. Thus, several DSPs look like a very large and powerful DSP array with a very wide memory bus.

Figure 3C:
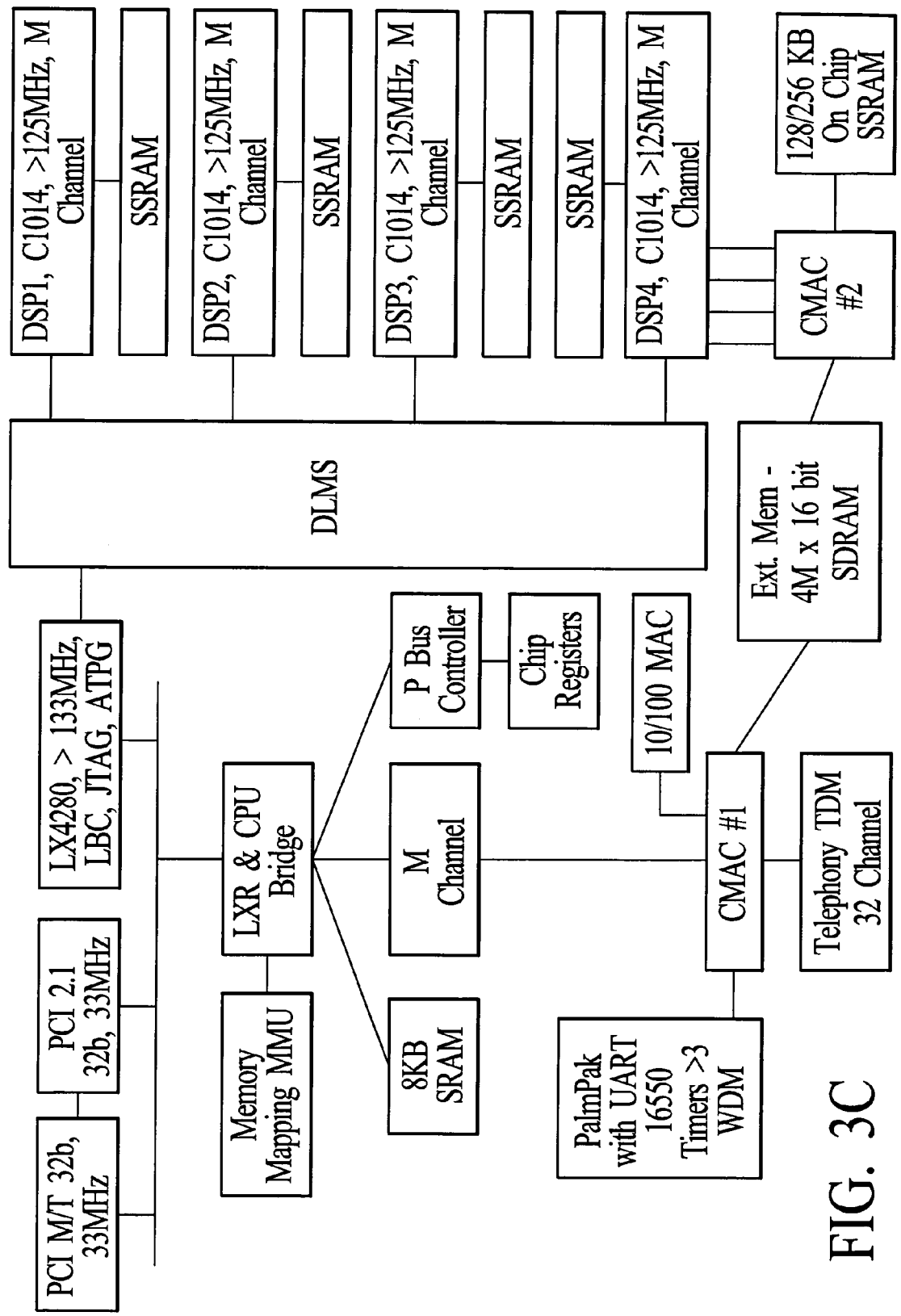
FIG. 3C illustrates a block diagram of a specific implementation of a DSP load management system in accordance with the preferred embodiment of the present invention.

FIG. 3C illustrates a block diagram of a specific implementation of a DLMS in accordance with the preferred embodiment of the present invention. It is important to note that other system architectures and components can be used in the present invention than those described herein.

Figure 4A:
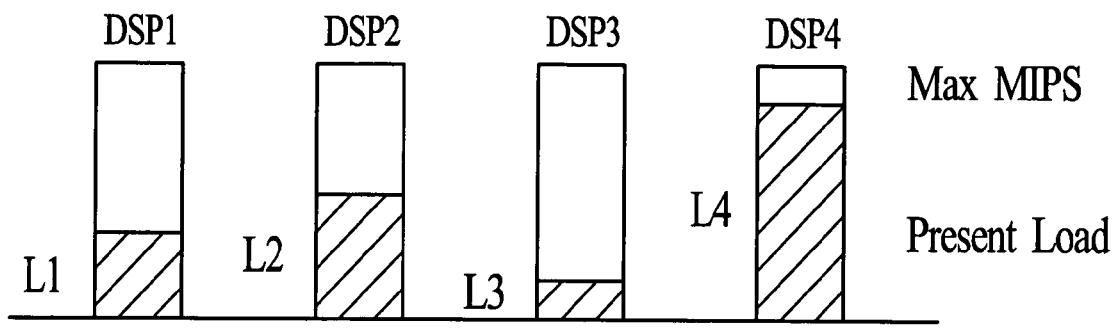
FIGS. 4A–4F illustrate the intra-transaction load optimization process using the DLMS in accordance with the preferred embodiment of the present invention.
Figure 4B:
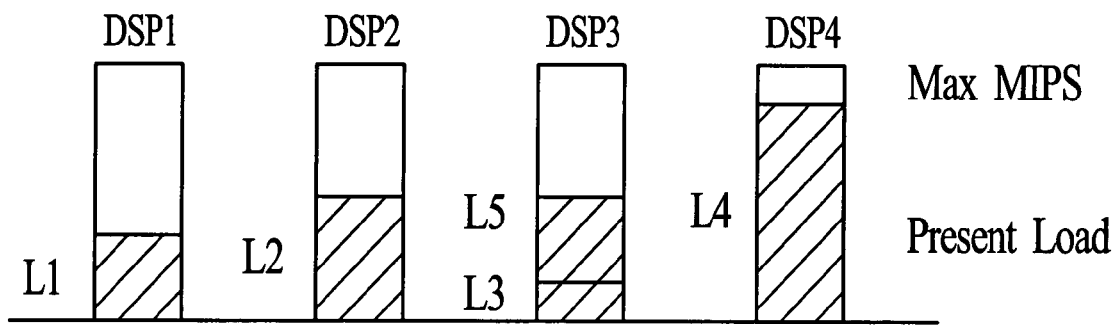

FIGS. 4A–4F illustrate the intra-transaction load optimization process using the DLMS of the present invention. FIGS. 4A–4F illustrate tables corresponding to four DSPs having the identical maximum load capacities (Max MIPS) and same beginning algorithms. It is assumed that DSP1 currently has a load L1, DSP2 has a load L2, DSP3 has a load L3, and DSP4 has a load L4. In FIG. 4B, when an additional load L5 (assume to have same algorithm) is introduced, the DLMS will recognize that load L5 has the same algorithm as loads L1–L4, and load it into the least loaded DSP at that time. In this case, load L5 is loaded into DSP3 since it is the least loaded DSP among the four DSPs. Load L5 may be transmitted from a CPU cache or from memory threads using the MT MMS.

Figure 4C:
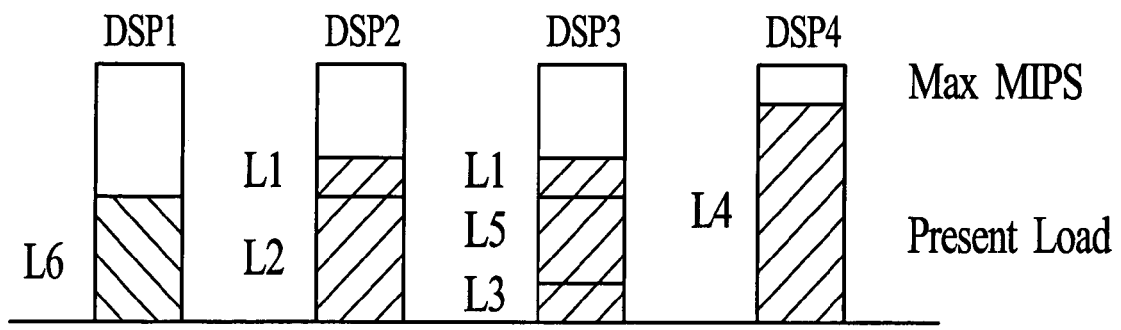

Next, assume that an additional load L6 with a different algorithm is required to be loaded in one of the four DSPs. In this case, one of the DSPs, i.e. DSP 1, will be cleared or flushed out so that the load L6 can be loaded therein. DSP1 is selected for loading load L6 because DSP1 is the least loaded DSPs, or alternatively, because of other pre-programmed instructions. In this example, the DLMS switches the load L1 from the DSP1 into DSP2 and DSP3 since DSP2 and DSP3 are least loaded than DSP4. In other examples, load L1 may be loaded in only one rather than two DSPs. After the load L1 is cleared or flushed out of DSP1, the load L6 is loaded therein as illustrated in FIG. 4C. Before load L6 can be loaded, the entire contents of the program memory and data tables need to be switched in DSP1. This is accomplished by the CPU writing to the DLMS registers to achieve direct memory access of program code in burst mode, as discussed in more detail later herein. The DSP1 pre-fetches the new program memory and data tables before the load L6 is loaded therein.

Figure 4D:
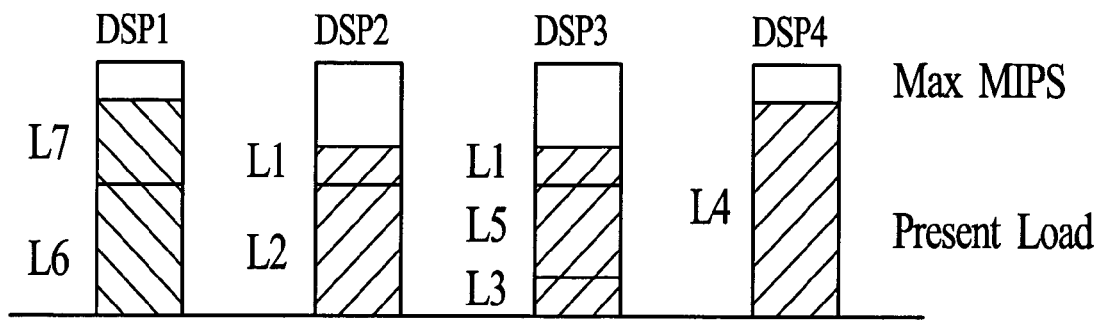
Figure 4E:
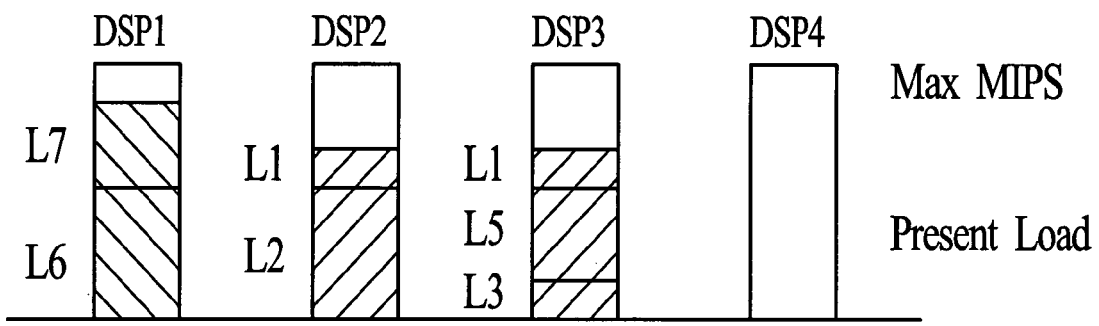
Figure 4F:
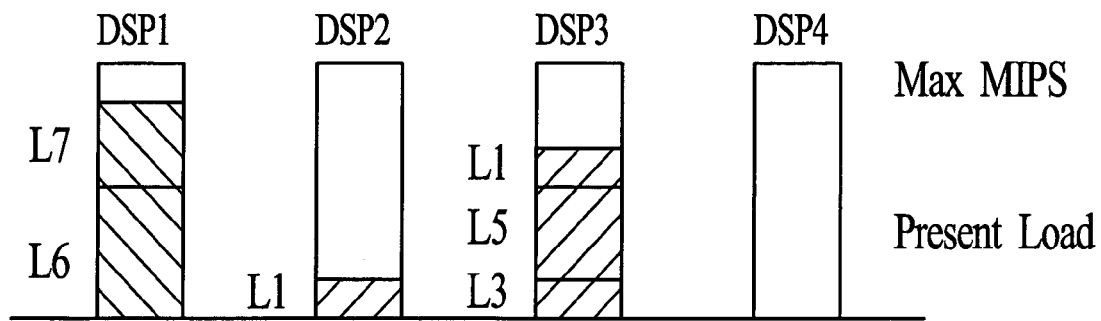

When an additional load L7 with the same algorithm as load L6 is processed by the DLMS, it is loaded into DSP1 because of the same algorithm, as shown in FIG. 4D. Thereafter, load L4 from DSP4 and load L2 from DSP2 are processed in the DSP4 and DSP2, respectively, and they are unloaded from their respective DSPs upon completion of processing at the end of the frame, as shown in FIGS. 4E–4F.

From the previous example, the DLMS distributes additional loads to one or more DSPs so that each DSP is processing efficiently and in unison. The DLMS may split loads between two or more DSPs or may load the additional load into one DSP, so long as the entire system is efficiently utilized. The DLMS allows the overall SOC device to function as efficiently as possible by distributing and/or re-distributing loads between multiple DSPs.

Figure 5A:
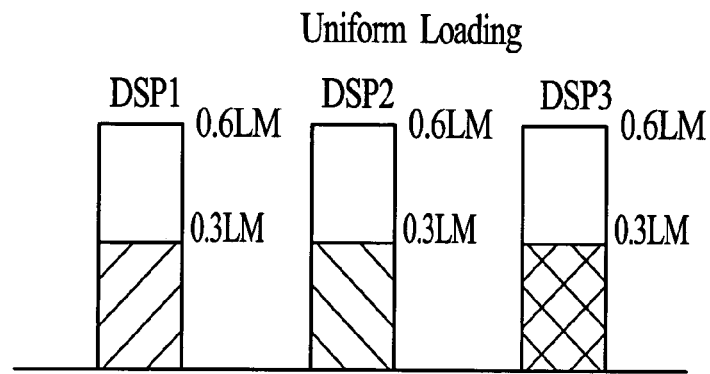
FIGS. 5A–5C illustrate an example of the DSP MIPS budget using three DSPs and two algorithms in accordance with the preferred embodiment of the present invention.
Figure 5B:
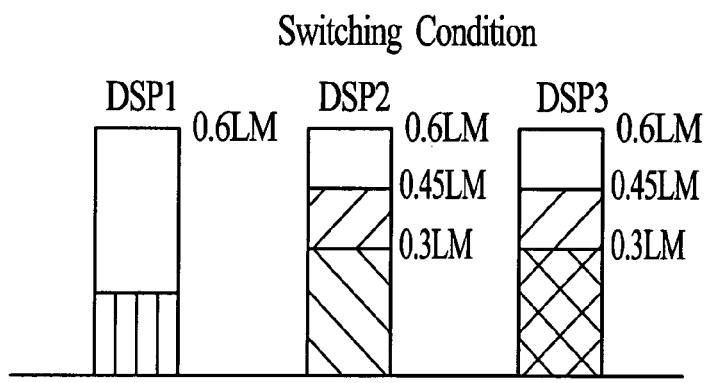
Figure 5C:
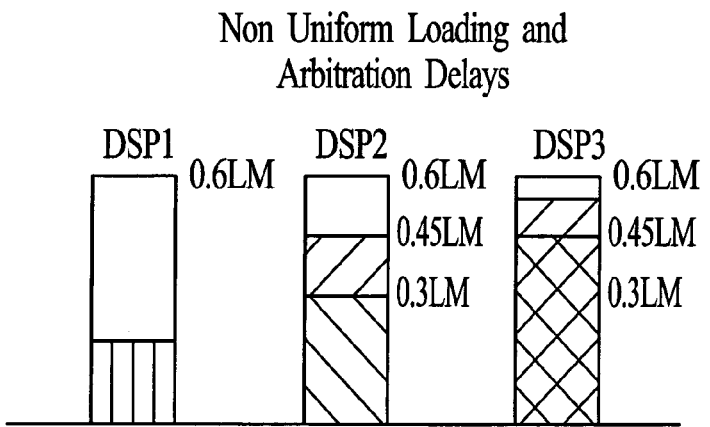

The DLMS can also predict the type of load and algorithm of arriving data so that they can be distributed appropriately to the multiple DSPs. The DLMS also allocates and distributes the new load uniformly among the several DSPs in order to reduce the time skew. In other words, the DLMS includes information relating to the internal characteristics of the DSPs. For example, the DLMS has information regarding the number of DSPs, their capacities (running at 200 MHz, processing capacity in 20 MIPS), present loading status (algorithms 1 is used in DSP 1, 2 and 3, and algorithm 2 is used in DSP 4, thus no resetting required), algorithms deployed and allowed, and algorithm to DSP preference or relationship table (know which algorithm to load to a particular DSP, by looking up on a table). FIGS. 5A–5C illustrate an example of the DSP MIPS budget using three DSPs and two algorithms with data being fed at predetermined time intervals of, for example, 10 milliseconds. When an SOC device has n DSPs, and the maximum load is LM, the average load per DSP for uniform loading is assumed to be LM/n. Also, the minimum additional DSP MIPS budget to allow for two algorithms switching is LM/n and the additional loading per DSP for uniform loading is now LM/n(n−1).

Thus, using the assumptions stated above, for n=3, the uniform loading for DSP MIPS budget is LM/3+LM/(3)(2), which is equivalent to 0.5 LM. The previous example illustrates that at least 50% LM of DSP loading is needed per DSP. Further, it is assumed that MIPS reserve for non-uniform loading and overhead margin is generally 20%, which is equivalent to 0.6 LM per DSP instead of 0.5 LM, as calculated above.

Figures 4G, 4H:
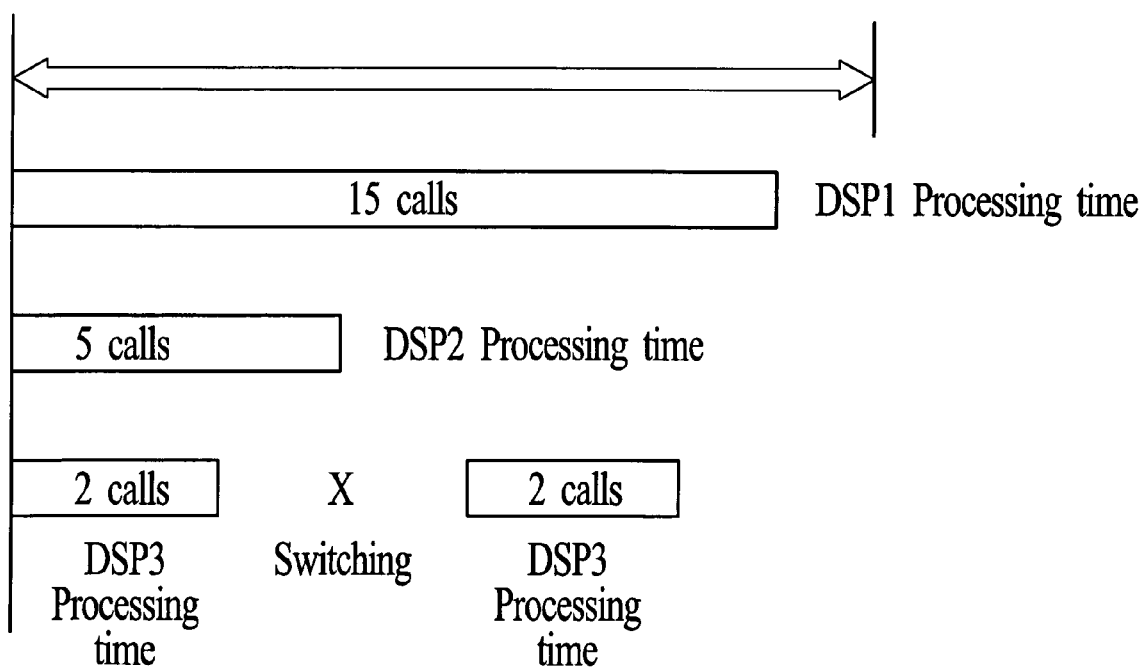
FIGS. 4G–4H illustrate the intra-transaction DSP algorithm switch optimization in accordance with the preferred embodiment of the present invention.

FIGS. 4G–4H illustrate the intra-transaction DSP algorithm switch optimization in accordance with the preferred embodiment of the present invention. Using a specific example, FIG. 4G illustrates a table having three DSPs and 4 running algorithms, and FIG. 4H illustrates a simplified time diagram of the DSPs processing times of the DSPs in FIG. 4G. In this example, there is an assumption that there are 24 calls of which 15 calls are running algorithm 1, 5 calls running algorithm 2, 2 calls running algorithm 3, and 2 calls running in algorithm 4. The 15 calls will be processed by the DSP1 running algorithm 1. DSP1 will have the longest processing time since it needs to process the most calls. The 5 calls will be processed by the DSP2 running algorithm 2, which processing time is less than DSP1. The 2 calls will be processed by DSP3 running algorithm 3, which processing time is less than DSP1 and DSP2. Since DSP3 processing time is the shortest, the final 2 calls are processed by DSP3 after switching such that algorithm 4 is used to process these final 2 calls. This optimization scheme allows all three DSPs to process the calls simultaneously while intelligent switching decisions are performed by the DLMS such that all three DSPs are working efficiently on one chip.

FIG. 5A illustrates the maximum load per DSP as being 0.6 LM for a total DSP MIPS of 1.8 LM for the case of three DSPs and two algorithms (switching once). When uniformly loaded, each DSP can be loaded similarly (e.g., 0.3 LM). In FIG. 5B, when switching is required in uniform loading, the load in DSP1 is re-distributed evenly and loaded into DSP2 and DSP3, thereby providing loads of 0.45 LM to DSP2 and DSP3. The new load is then loaded into the DSP1. FIG. 5C illustrates a condition when there are non-uniform loading and arbitration delays associated with the system. In this case, DSP2 and DSP3 do not have the same loads therein.

Figure 6A:
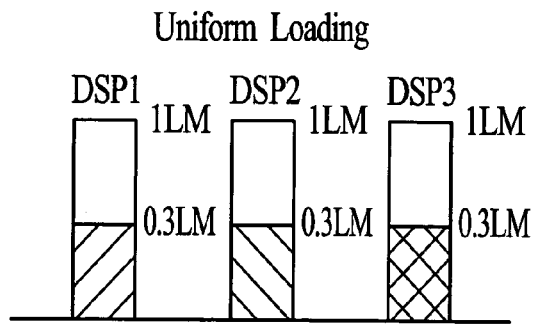
FIGS. 6A–6C illustrate an example of the DSP MIPS budget using three DSPs and three algorithms in accordance with the preferred embodiment of the present invention.
Figure 6B:
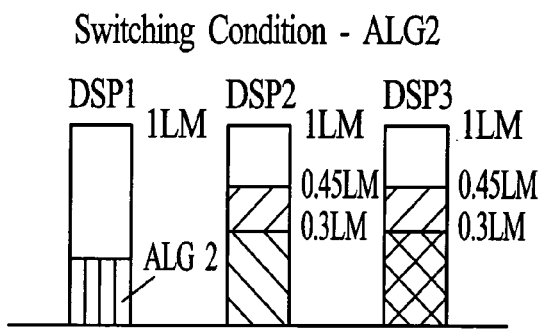
Figure 6C:
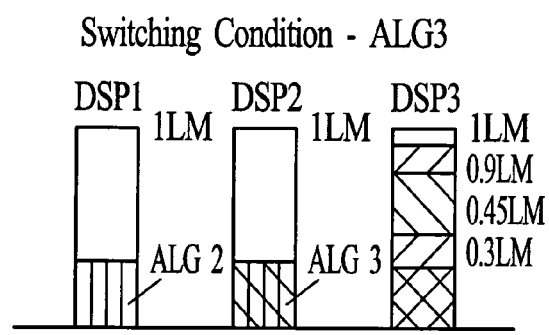
Figure 6C:
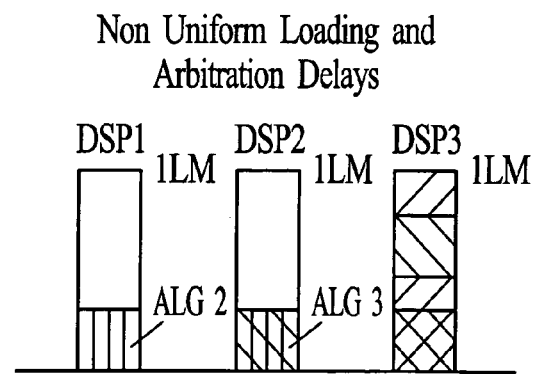

FIGS. 6A–6C illustrate an example of the DSP MIPS budget using three DSPs and three algorithms with data being feed at intervals of, for example, 10 milliseconds. Using the same formulation discussed above, the maximum load per DSP is 1 LM, which equates to a maximum load of 3 LM for the three DSPs and three algorithms (switching twice). This is illustrated in FIG. 6A. FIG. 6Bi illustrates tables after the second algorithm is loaded into the DSP1. In this case, the load that was originally in the DSP1 is flushed or cleared out and is loaded into the DSP2 and DSP3 in equal loads. This allows the new load with the second algorithm to be loaded into DSP1, as shown in FIG. 6Bi. Thereafter, when a third algorithm is inputted into the DSP array, the load in the DSP2 is again flushed or cleared out and is loaded into DSP3. The load having the third algorithm is then loaded into DSP2, as illustrated in FIG. 6Bii. In this example, DSP1 includes loads corresponding to the second algorithm, DSP2 includes loads corresponding to the third algorithm, and DSP3 includes loads corresponding to the first algorithm. Additionally, FIG. 6C illustrates tables that corresponding to conditions with non-uniform loading and arbitration delays.

Assume that there are more algorithms than there are DSPs, then optimization is required intra-transaction between the DSPs. Using the example where there are 5 algorithms and 4 DSPs for simplicity. Assume that there are 24 T1 channels and all DSPs can handle the same amount of MIPS. DSP1 takes 15 calls, DSP2 takes 5 calls for algorithm 2. The smaller loads of 2 for algorithms 3 and 4 are sent to DSP3. Thus, the DSP3 switches once. Time wise during transaction time DSP1 takes time a, DSP2 takes time b and DSP 3 takes time c including the switching time for the two algorithms. This invention allows switching within DSPs when one DSP has to handle more than one algorithm.

From the previous examples, one skilled in the art can implement any number of DSPs and different algorithms to efficiently distribute and redistribute loads between the DSPs using the DLMS. The DLMS can process both voice channels (i.e., 30 channels) and modem data channels (i.e., 16 channels) simultaneously in a single or multi-user mode. The DLMS balances the loads in order to effectively and efficiently utilize all the available resources in the system. Preferably, dynamic load balancing decisions are based on current assignment at load arrival times to achieve an equal balance of the load although there may be high load variations or load surges.

The DLMS can also achieve both inter- and intra-transaction parallelism or concurrent execution of independent transactions. For example, the DSP1 can process one part of the transaction and DSP2 can process another part of the transaction. Each DSP associated with the DLMS can have 8 stage pipeline parallelism. The DLMS also assumes that the input data queue will be stored in a DRAM/Data cache, which data is staged at intervals less than 80 TDM frames to reduce transaction response time. When the DLMS works in conjunction with the MT MMS, they can support high degree of inter/intra transaction parallelism from shared on/off chip high-speed external memory.

As discussed above, one of the important features of the DLMS of the present invention is its ability to switch algorithms from one DSP to another. The DLMS includes functionality that allows for predictive or forward-looking action for early protocol switch-warning, data queue optimization and latency trade off. In case of a very high throughput system having a large DSP array, the DLMS must be capable of interfacing directly with the memory system or multiple CPUs to control the data delivery to the DSP array. Preferably, the DSPs used in the present invention should be capable of processing a 24-channel T1 span of VoIP (Voice over IP) or FoP (Fax over IP) per processor or up to 16-channels of modem data.

Each DSP can function as a coprocessor to a CPU. This enables the CPU to transmit data/instructions and "start conditions" to the DSP in a more efficient manner. The CPU then receives the data/instructions when the DSP is done. In this manner, data/instructions are sent back and forth between the CPU and the DSP when the CPU executes the appropriate instructions. The DSP can also issue an interrupt signal to the CPU and alter the execution flow of the CPU.

There are generally two commands (instructions) for loading/storing data between main memory and the general registers of the coprocessors. The memory can be either on the CPU bus or internally in RAM on the cache bus. Because the coprocessor cannot stall the CPU, read and write signals have to be completed within one clock cycle. The CPU can also load and store to these registers either from memory or from ALU registers. Preferably, the coprocessor instructions perform single word transfer to/from CPU register to DSP register.

Figure 7A:
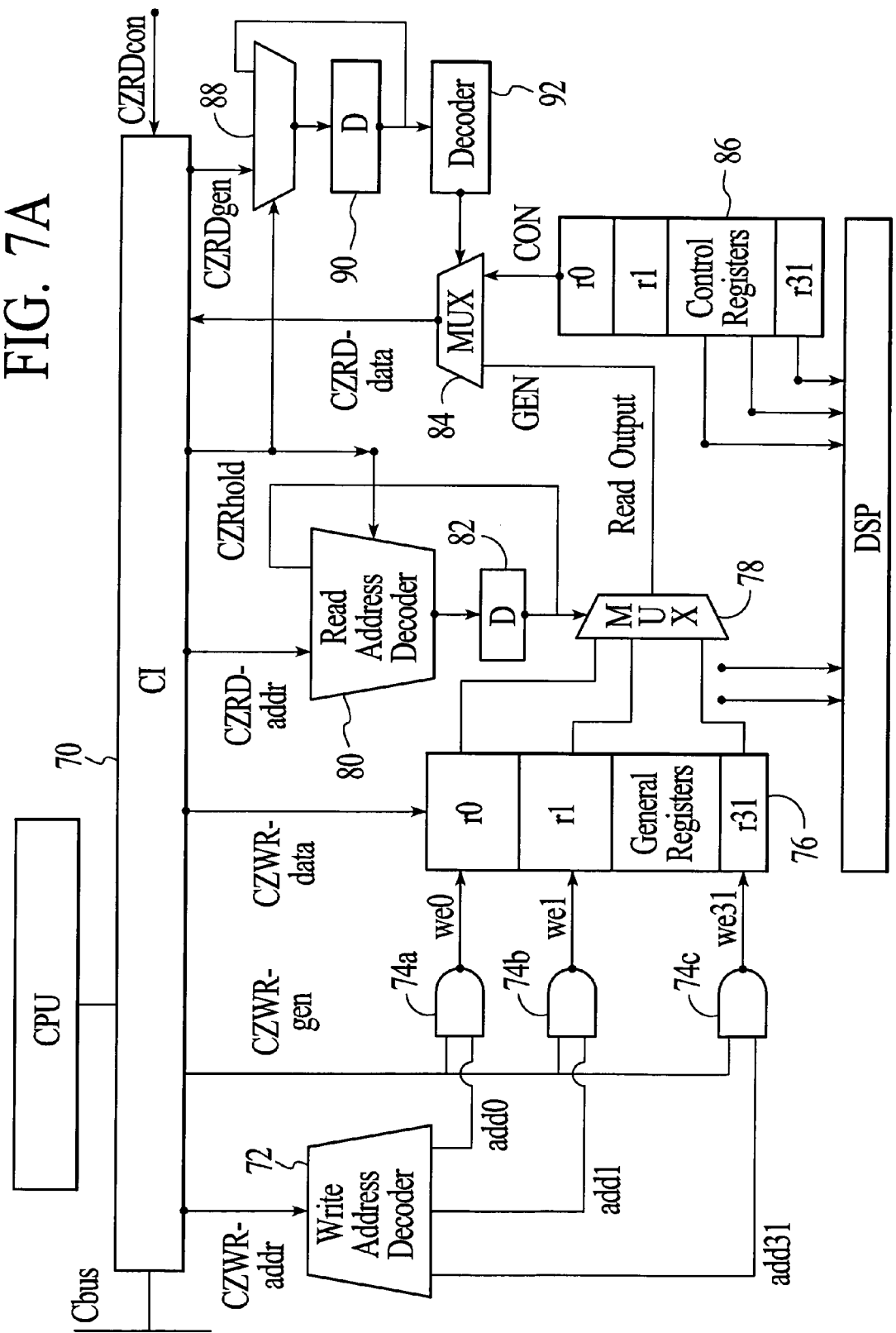
FIGS. 7A–7B illustrate a schematic diagram of a coprocessor interface, CPU, and DSP in accordance with the preferred embodiment of the present invention.

FIG. 7A illustrates a schematic diagram of a co-processor interface (CI) of the DLMS, CPU, and DSP in accordance with the preferred embodiment of the present invention. The signal definitions are now described for a more complete understanding of the present invention: Z represents the DSP number; CZWR_addr represents the write address for coprocessor interface Z; CZWR_gen represents the select signal for general register of processor Z; we0 represents the write enable of register 0; we31 represents the write enable of register 31; CZRD_addr represents the read address for processor Z; CZRD_con represents the read coprocessor Z or general register; CZWR_data represents the write data to coprocessor Z; and CZRhold represents coprocessor Z must hold the previous value of read data on the read data bus.

The coprocessor interface (CI) 70 can support up to 32 general registers 76, 32 control registers 86, and a control flag. In greater detail, a CZWR-addr signal is transmitted from the CI 60 to a write address decoder 72, which in turn generates signals for inputting into AND gates 74a, 74b, . . . , 74n. In addition, CZWR-gen signals are also inputted into the AND gates 74a, 74b, . . . 74n. The outputs of the AND gates we0, we1, . . . we31, are then inputted in the general registers 76 having 32 general registers along with the CZWR-data signal from the CI 70.

During operation, the CPU via the coprocessor interface issues a write address CZWR_addr. The address is decoded in the write address decoder 72. A select signal for general register for the processor CZWR_gen along with the write address CZWR_addr are inputted in the AND gates 74a, 74b, 74c for generating write enable signals we0, we1, we31. The write enable signals we0, we1, we31, or communication data is then written in the registers using the write data to coprocessor signal CZWR_data. Data from the general registers is then transmitted into a first MUX 78 and outputted to a second MUX 84. An output from the control registers 86 works in the same manner as described above. The read address decoder 80 reads the write address CZWR_addr along with the CZRhold signal and then issues a read address to the MUX 78 via the delay 82. Further coupled to the MUX 84 are control registers 86 having 32 control registers.

Figure 7B:
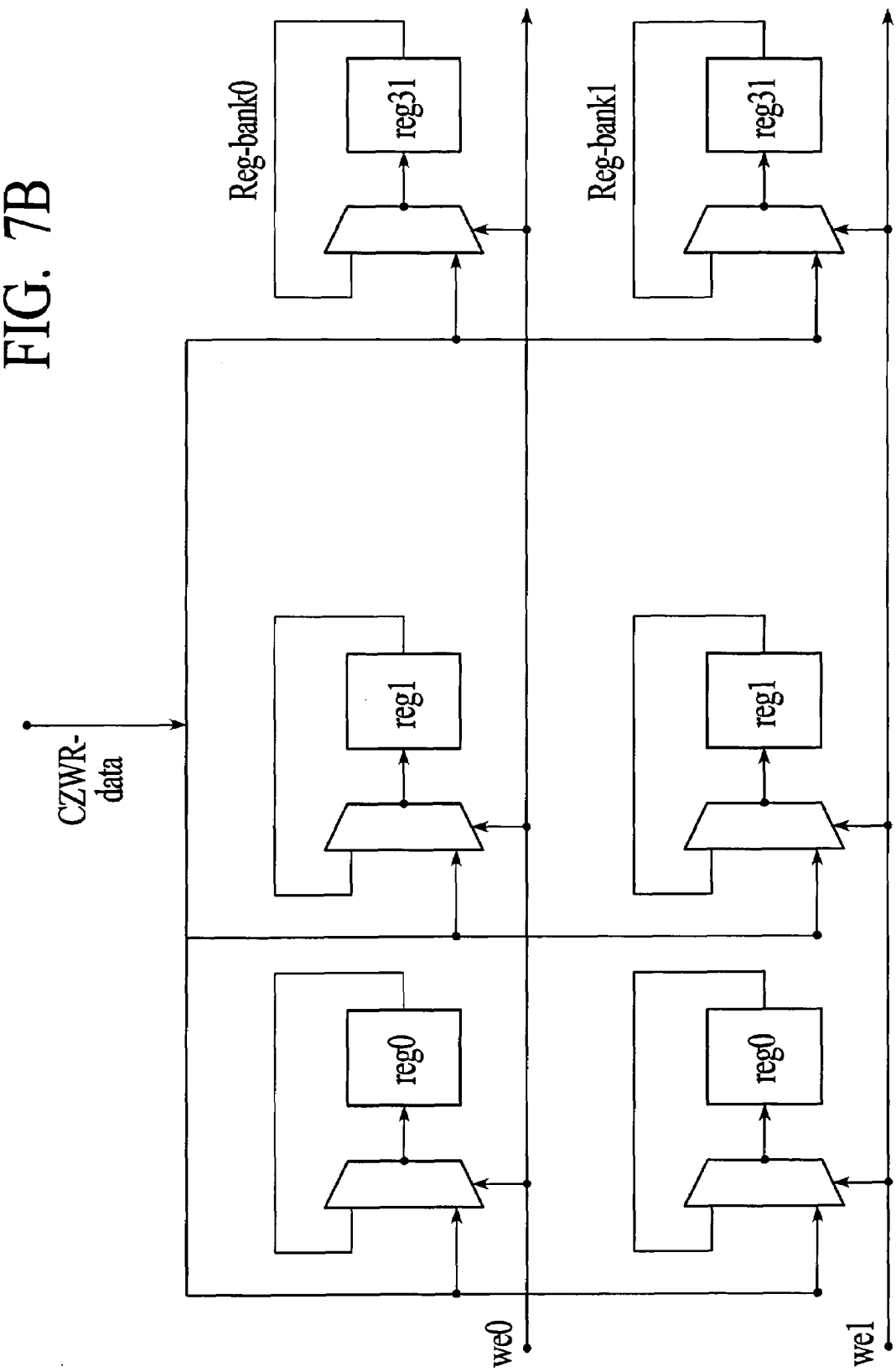

FIG. 7B illustrates an example of an implementation of the general and control registers 76, 86 using multiple MUXs and flip-flops.

Figure 8A:
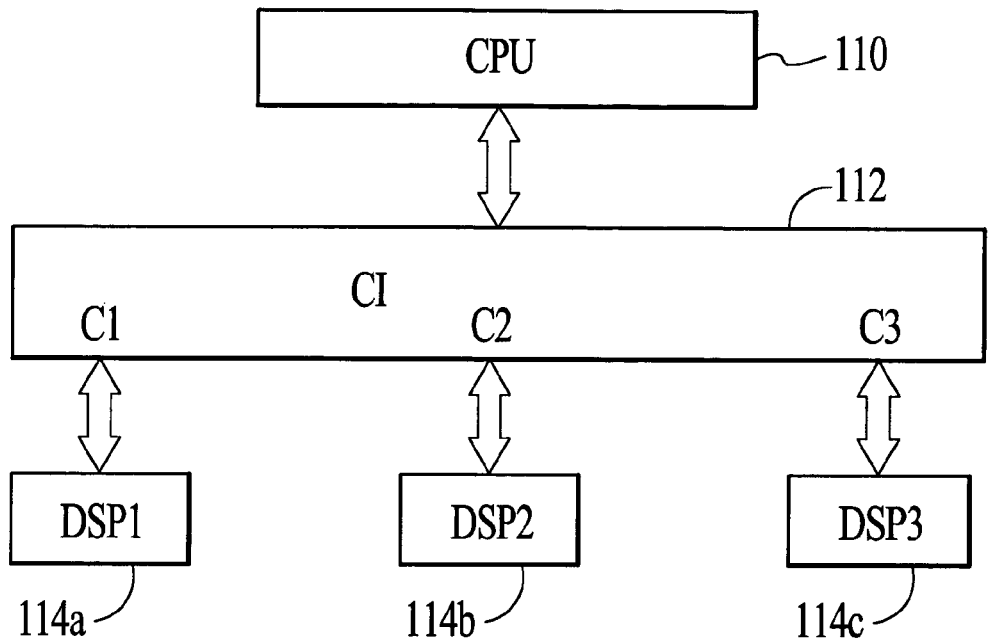
FIGS. 8A–8B illustrate multi-coprocessor interfaces that can be implemented in accordance with the preferred embodiment of the present invention.
Figure 8B:
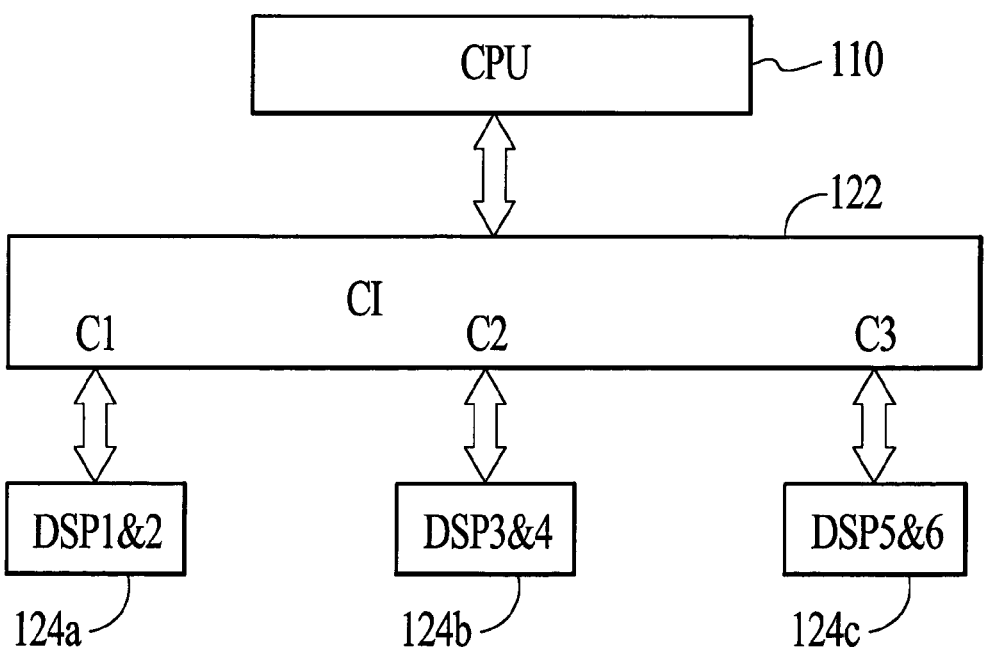

FIGS. 8A–8B illustrate multi-coprocessor interfaces that can be implemented in accordance with the preferred embodiment of the present invention. In FIG. 8A, the coprocessor interface (CI) 112 is interfaced between a CPU 110 and three DSPs 114a, 114b, 114c. The CI 112 includes three ports C1, C2, C3, where each port is used for communicating with each DSP 114a, 114b, 114c, respectively. Preferably, the communication link between the CI 112 and each DSPs 114a, 114b, 114c, can accommodate 64 I/O data, 5 Raddr, 5Waddr and other controls. FIG. 8B illustrates an CI 122 interfaced to the CPU 110 similar to the manner described in FIG. 8A. The CI 122, however, includes ports C1, C2, C3, where each port communicates with at least two DSPs. For example, port C1 communicates with DSP array 124a, port C2 communicates with DSP array 124b, and port C3 communicates with DSP array 124c.

Figure 9A:
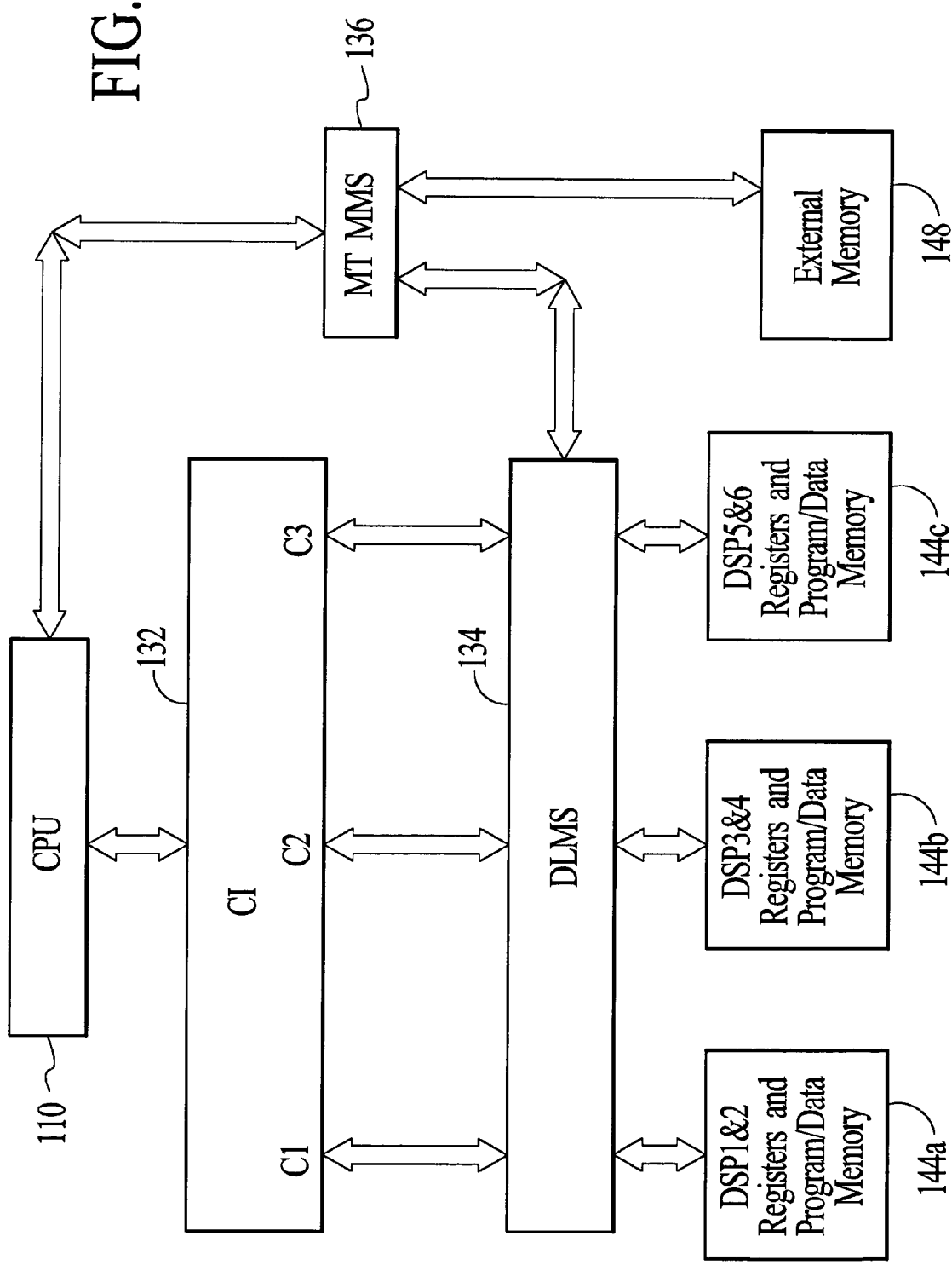
FIG. 9A illustrates a system including a CPU, CI, DLMS, MT-MMS and multiple DSPs in accordance with the preferred embodiment of the present invention.
Figure 12:
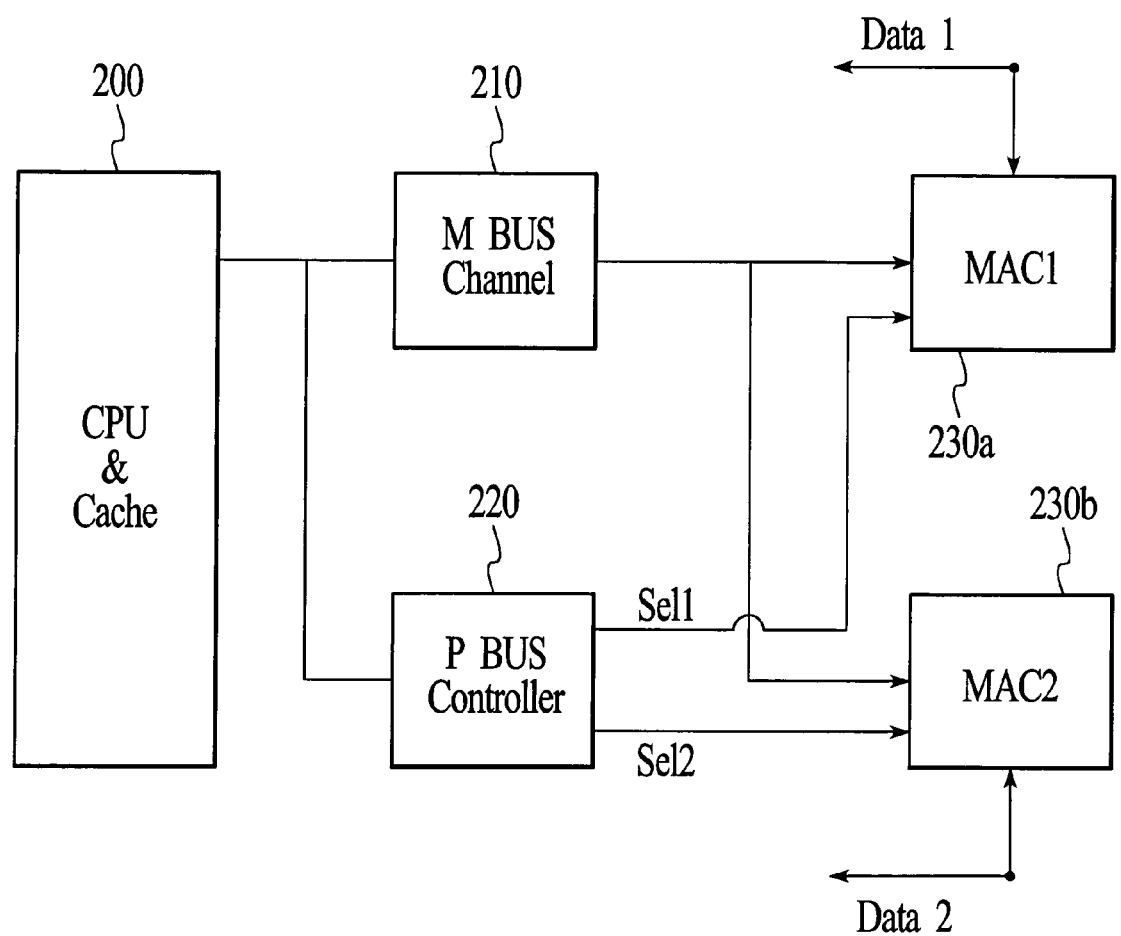
FIG. 12 illustrates a system including a CPU connected to memory access controllers in accordance with the preferred embodiment of the present invention.

FIG. 9A illustrates a system including a CPU, CI, DLMS, MT-MMS, memory access system, and multiple DSPs in accordance with the preferred embodiment of the present invention. As illustrated, the CI 132 is interfaced between the CPU 110 and the DLMS 134. The DLMS 134 communicates with DSP array 144a, 114b, 144c via ports similar to the ports C1, C2, C3 in the CI 132. Also included in this system is an MT MMS 136, which communicates directly with the CPU 110 and the DLMS 134 for managing memory requests. In other embodiments, the CPU 110 can be connected to memory access controllers (MAC) via M bus channel and a P bus controller as illustrated in FIG. 12. This effectively converts the shared memory between the multiple DSP systems to effectively shared nothing (SN) DSP to six separate memory sections threaded by separate memory access controller threads.

The DSPs 1–6 can be programmed as a sea of gate machines (i.e., they must not all be of the same kind). The DLMS 134 will give each DSP tasks that best matches its capabilities. For example, one DSP may be a 16×16 array of multiply and accumulate MAC devices. The DLMS 134 will then extract the algorithms or the parts of the algorithms that are suitable for massive parallel processing and assign them to this particular DSP having the 16×16 MAC array. It will also thread the results into it from another programmable DSP and thread the results out of it into another programmable DSP. The point here is that there are several levels of optimization possible in implementing several algorithms in parallel such as (1) intra-transaction optimization, (2) inter-transaction optimization, and (3) inter-algorithm/sample processing optimization. This includes selecting parts of the sample algorithm to thread out to parallel sea of gate array DSP. The interaction between the CPU and the DLMS hardware is designed to achieve dynamic (i.e., in real time) optimization of the load assignment between the DSPs. The sea of gate DSP with an array of MACs may have much more restrictive number of DSP instructions than a programmable DSP.

Figure 9B:
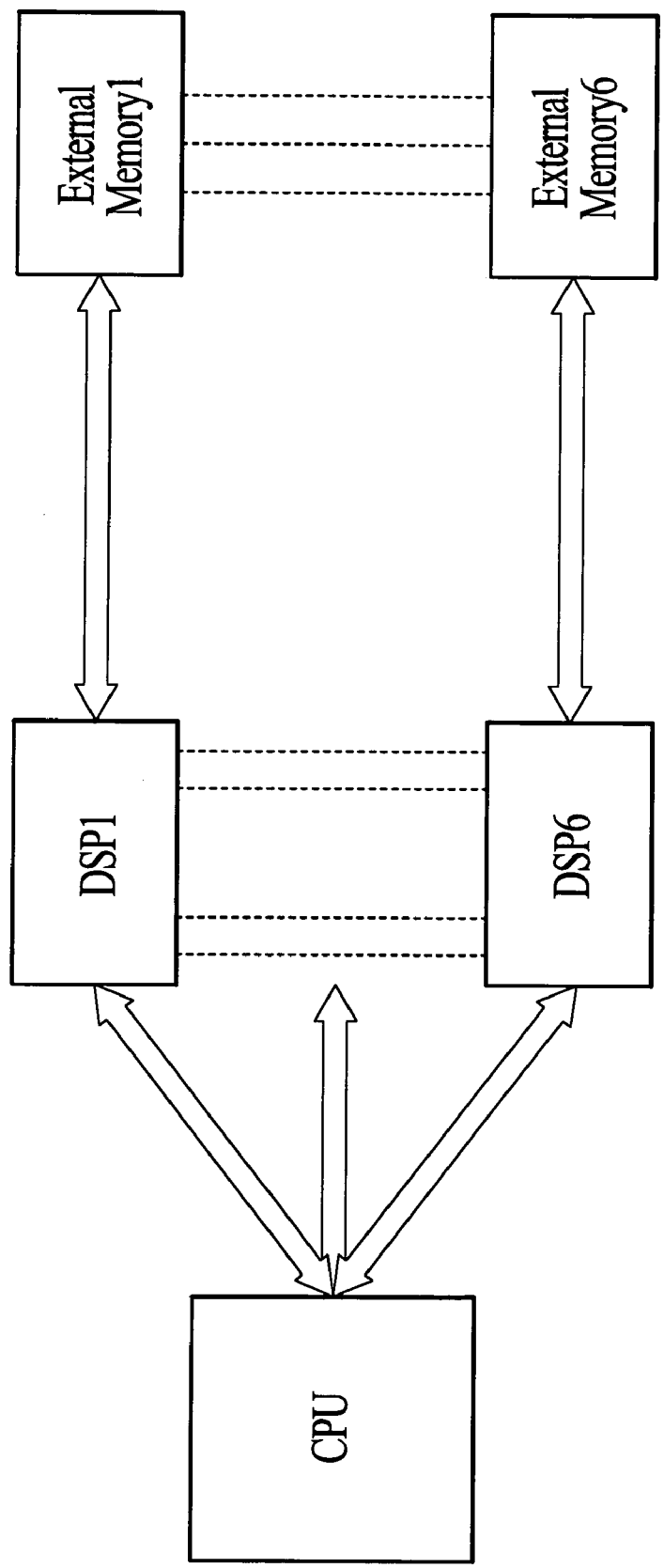
FIG. 9B illustrates an effective behavior model of the system in FIG. 9A in accordance with the preferred embodiment of the present invention.

FIG. 9B illustrates an effective behavior model of the system in FIG. 9A in accordance with the preferred embodiment of the present invention. Effectively, the system illustrated in FIG. 9A can be shown as a CPU communicating with multiple DSPs on a very wide bus, with the DSPs communicating with multiple external memories on another very wide bus.

Figure 10:
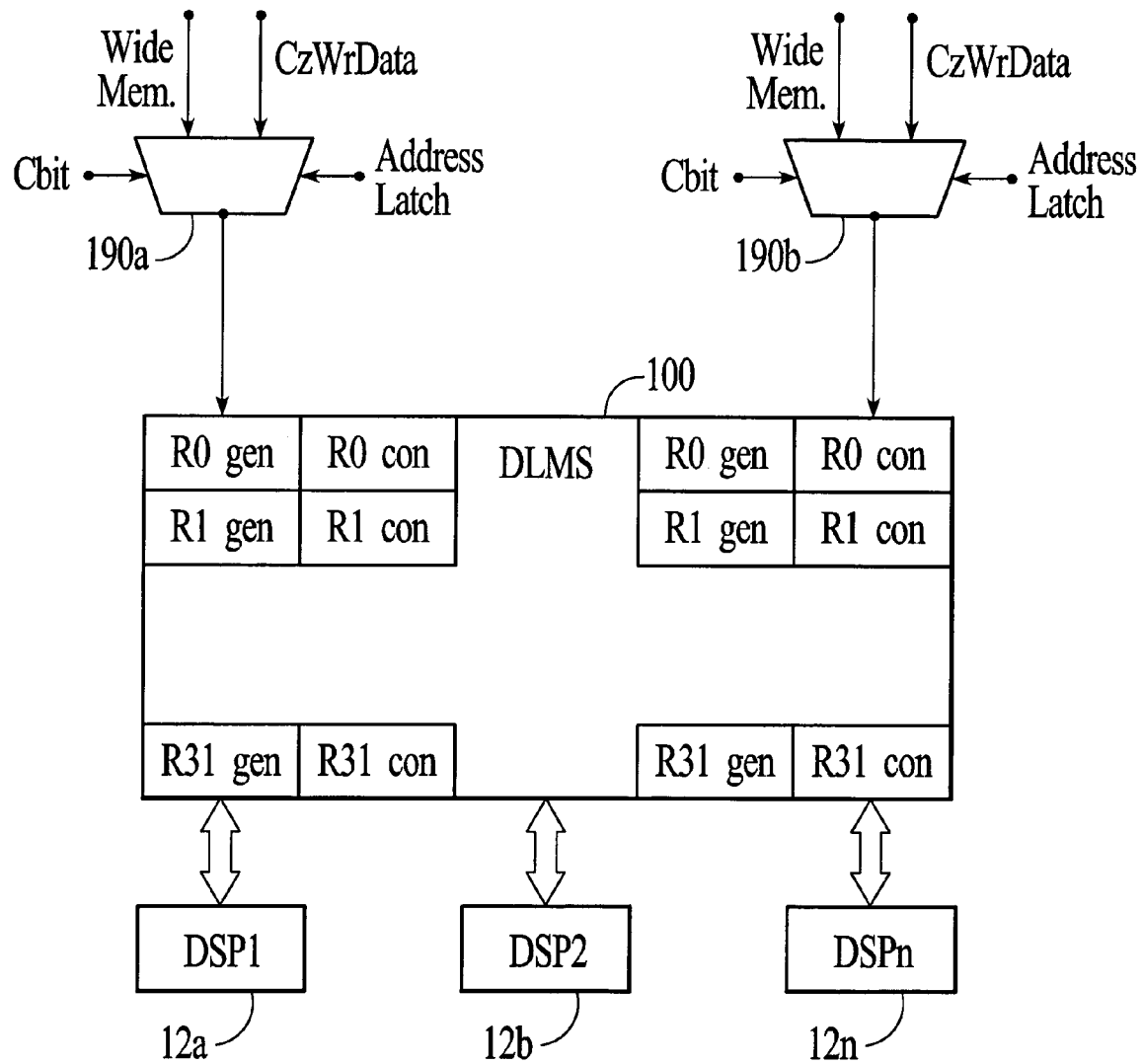
FIG. 10 illustrates a MT MMS loading DSP with high frequency data in accordance with the preferred embodiment of the present invention.

FIG. 10 illustrates an MT MMS loading DSP with high frequency data in accordance with the preferred embodiment of the present invention. The wide memory is 4×16 or 4×32 bits. The registers in the DLMS 100 can be loaded from the CPU or from external memory. The CPU may provide the data from the address latch and can read from the wide bus. The DLMS registers are written from data via the MUX 190a, 190b. The signals sent to the MUX 190a, 190b, include data from the wide memory bus, CZWR_data, Cbit, and Address latch. The DSPs 12a, 12b, 12n communicates with the DLMS 100 to access data in the registers.

Figure 11:
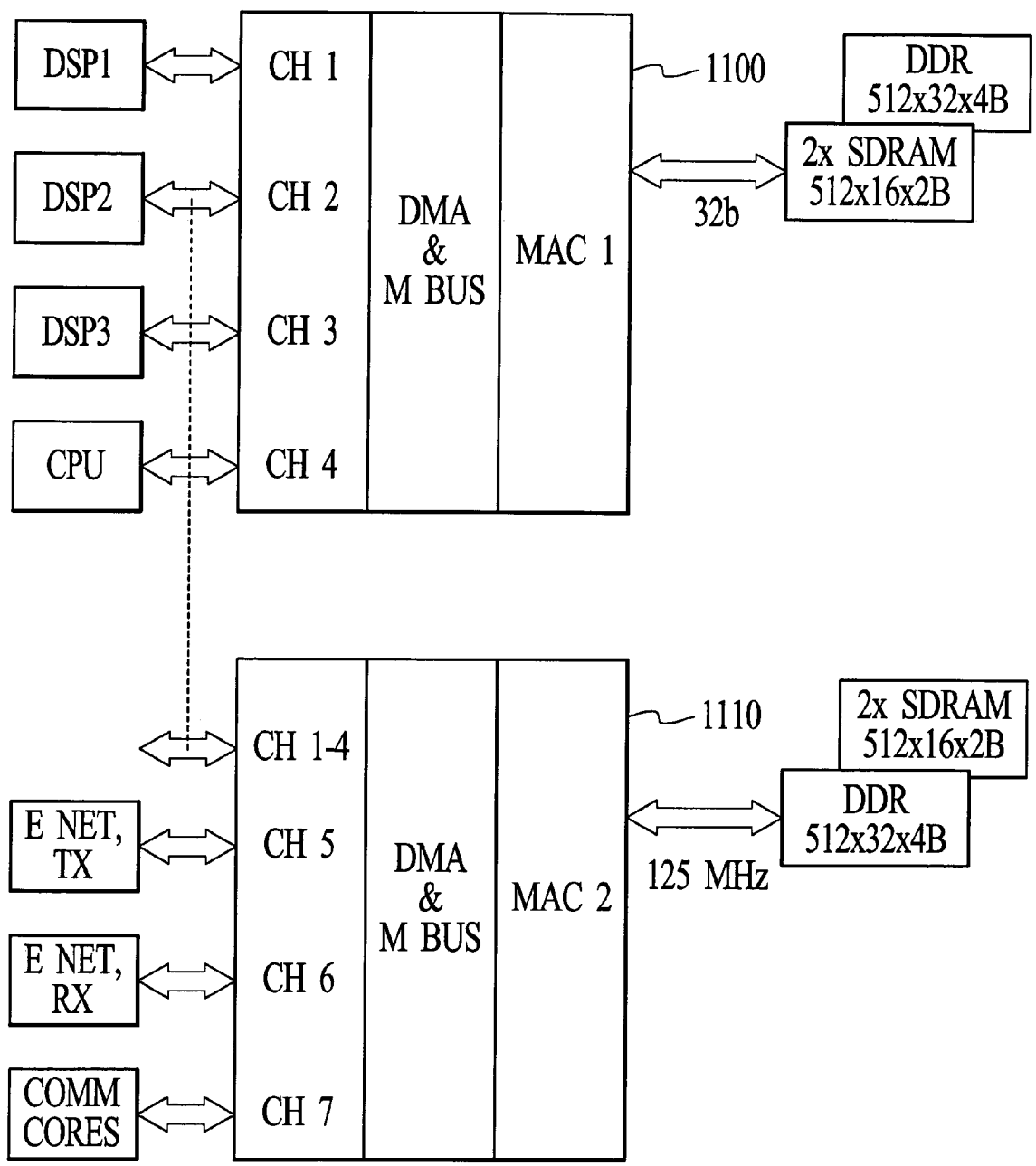
FIG. 11 is an example of a two threaded memory which is used with two memory access controllers in accordance with the preferred embodiment of the present invention.

FIG. 11 illustrates an example of a two threaded memory which is used with two memory access controllers (MACs) in accordance with the preferred embodiment of the present invention. In lieu of using the MT MMS as described earlier herein, the present invention can be implemented with multiple MACs. Each channel is connected to a DMA and memory bus (M Bus). In the first MAC1 1100, DSP 1 is connected to channel 1, DSP 2 is connected to channel 2, DSP 3 is connected to channel 3, and DSP 4 is connected to channel 4. In the second MAC2 1110, DSPs 1–4 are connected to channels 1–4, Ethernet transmit (E Net TX) is connected to channel 5, Ethernet receive (E Net RX) is connected to channel 6, and communication cores are connected to channel 7. In this manner, DSP1 and DSP2 can access the MAC1 1100 via channels 1 and 2, while DSP 3 and CPU can access the MAC2 1110 via channels 1–4 for simultaneous data processing.

To better describe this figure, assume that DSP 1 requires the bandwidth of 40 to 60 Mb/sec and the CPU requires 80 to 100 Mb/sec and the bus between the MACs and the memory provides only 100 Mb/sec (after averaging). Then, only two MACs as illustrated herein can handle both processors at the same time. Compared to a system having the MT-MMS with arbitration capabilities, the CPU in FIG. 11 has to make sure that data is not routed to the same MAC.

FIG. 12 illustrates a system including a CPU connected to memory access controllers in accordance with the preferred embodiment of the present invention. There is a separate peripheral control bus controller 220 and memory bus channel 210 between the CPU and the MACs 230a, 230b. Depending on the address being issued, the control bus controller 220 can select the proper MAC via signals SEL1 and SEL2.

Figure 13:
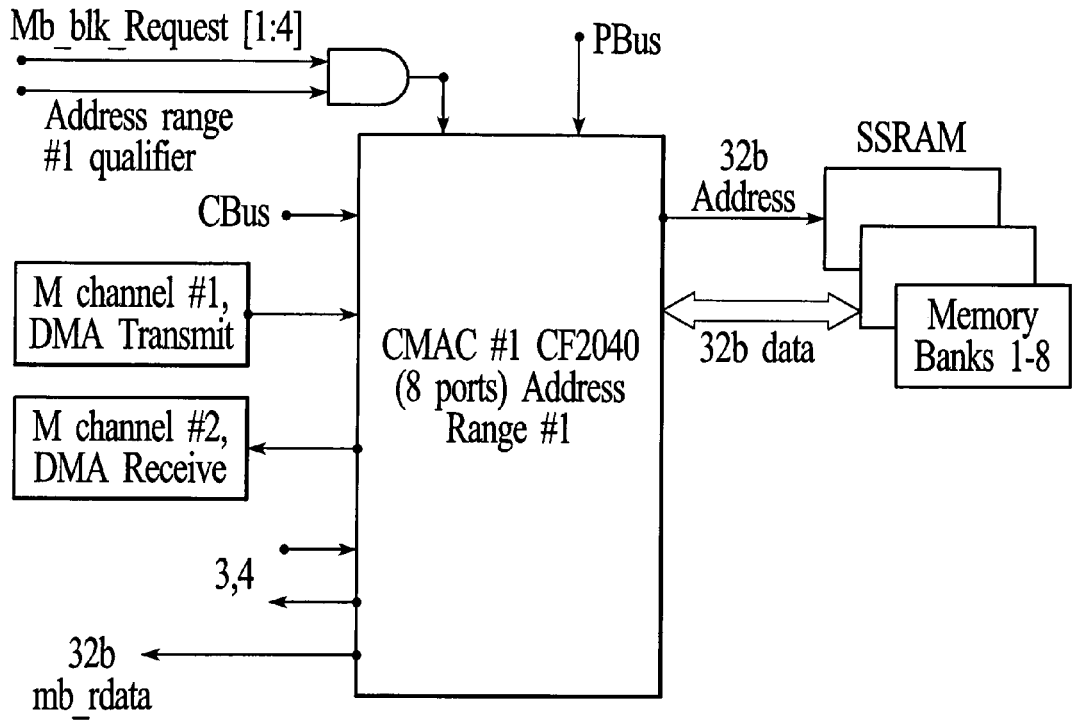
FIG. 13 illustrates a specific implementation of DMA and MAC cluster in accordance with the preferred embodiment of the present invention.
Figure 13:
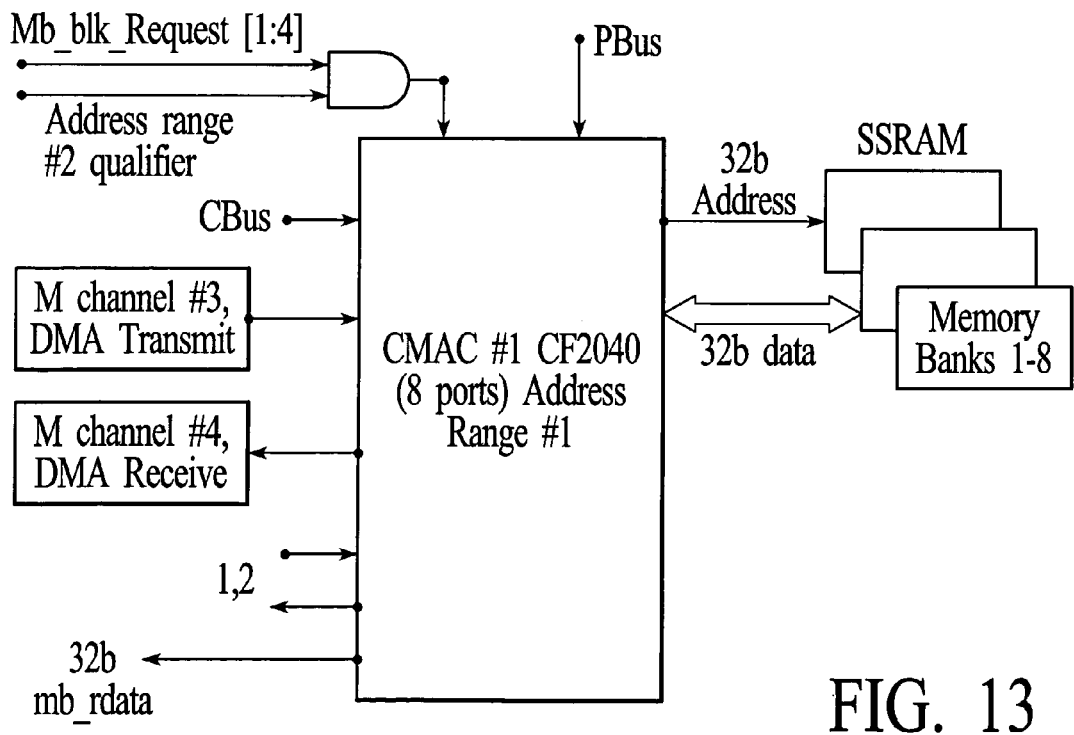

Next, FIG. 13 illustrates a specific implementation of DMA and MAC clusters in accordance with the preferred embodiment of the present invention. Again, it is important to note that other system architectures and components can be used in the present invention than those described herein. The request signal for a particular MAC is sent via signals Mb_blk Request and address range qualifier. Based on the address sent, the MAC1 or MAC2 is selected for reading/writing data. What is important to note from this diagram is that there are separate data uses for receiving data in a simultaneous manner.

Figure 14:
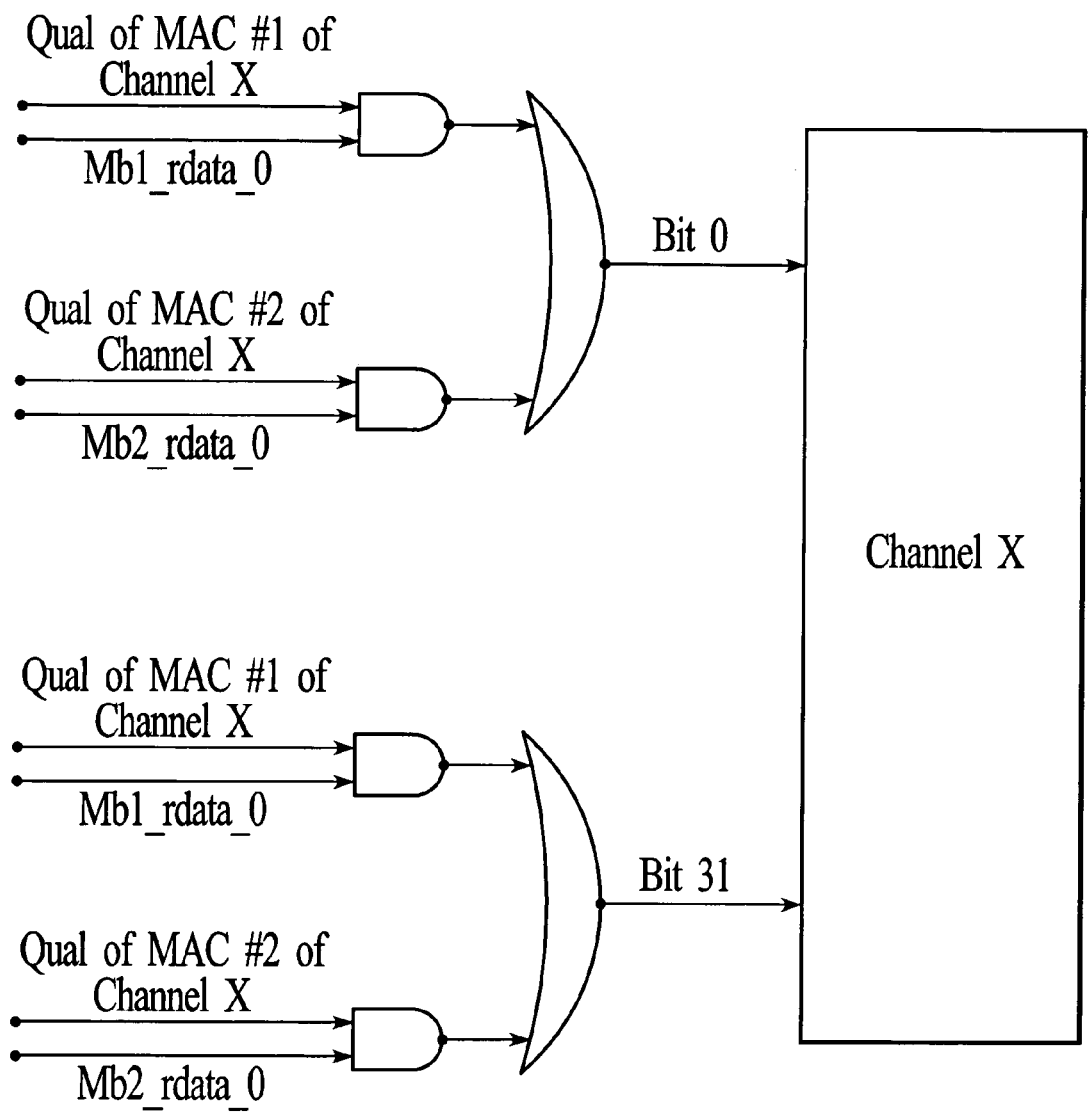
FIG. 14 illustrates a diagram of multiplexing the data bus to individual channels in accordance with the preferred embodiment of the present invention.

FIG. 14 illustrates a diagram of multiplexing the data bus to individual channels in accordance with the preferred embodiment of the present invention. The data from the MACs is preferably a 32 bits wide and is sent to the multiple AND gates. Each bit is coming from either MAC1 or MAC2. Depending on which channel is active (qual), one of the AND gates give an output and into the right channel. For each of the CPU, DSP, DLMS, and communication cores, there is data coming from two data bits to generate the final data output into the channel X.

Figure 15:
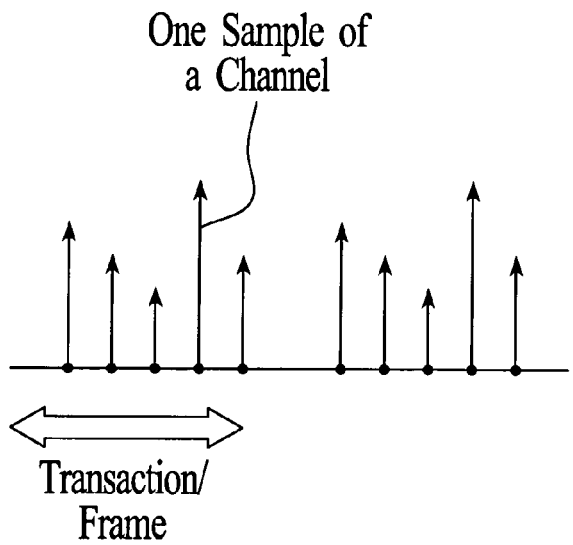
FIG. 15 illustrates a flow chart implementing the real time load management system in accordance with the preferred embodiment of the present invention.
Figure 15:
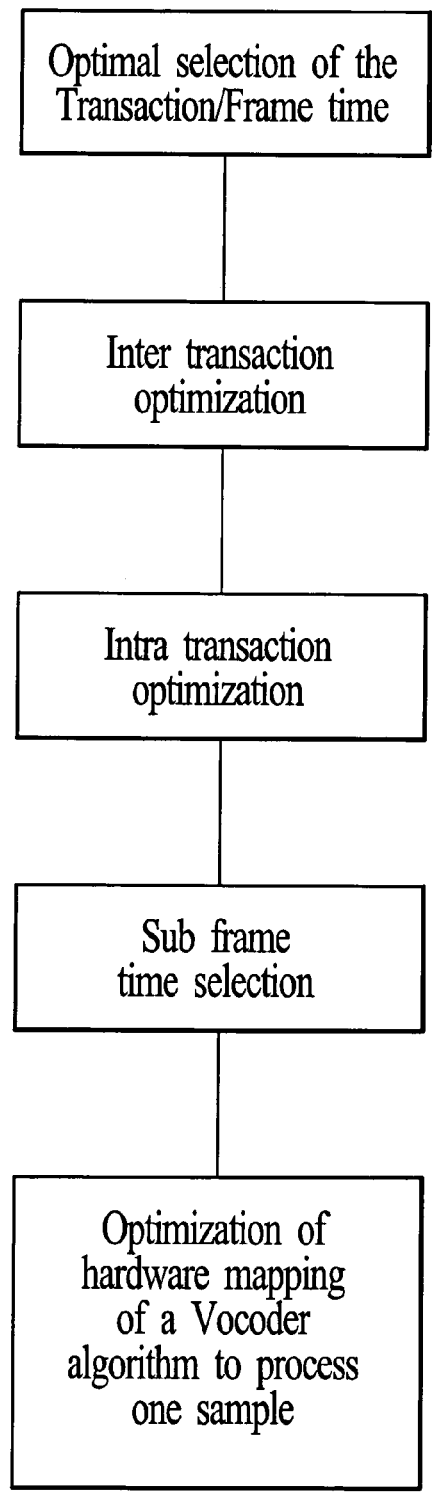

FIG. 15 illustrates a flow chart implementing the real time load management system in accordance with the preferred embodiment of the present invention. As shown and discussed earlier herein, the present invention can be used for optimizing (1) selection of the transaction/frame time, (2) inter-transactions, (3) intra-transactions, (4) sub-frame time selection, and (5) hardware mapping of a vocoder algorithm to process a sample.

Figure 16:
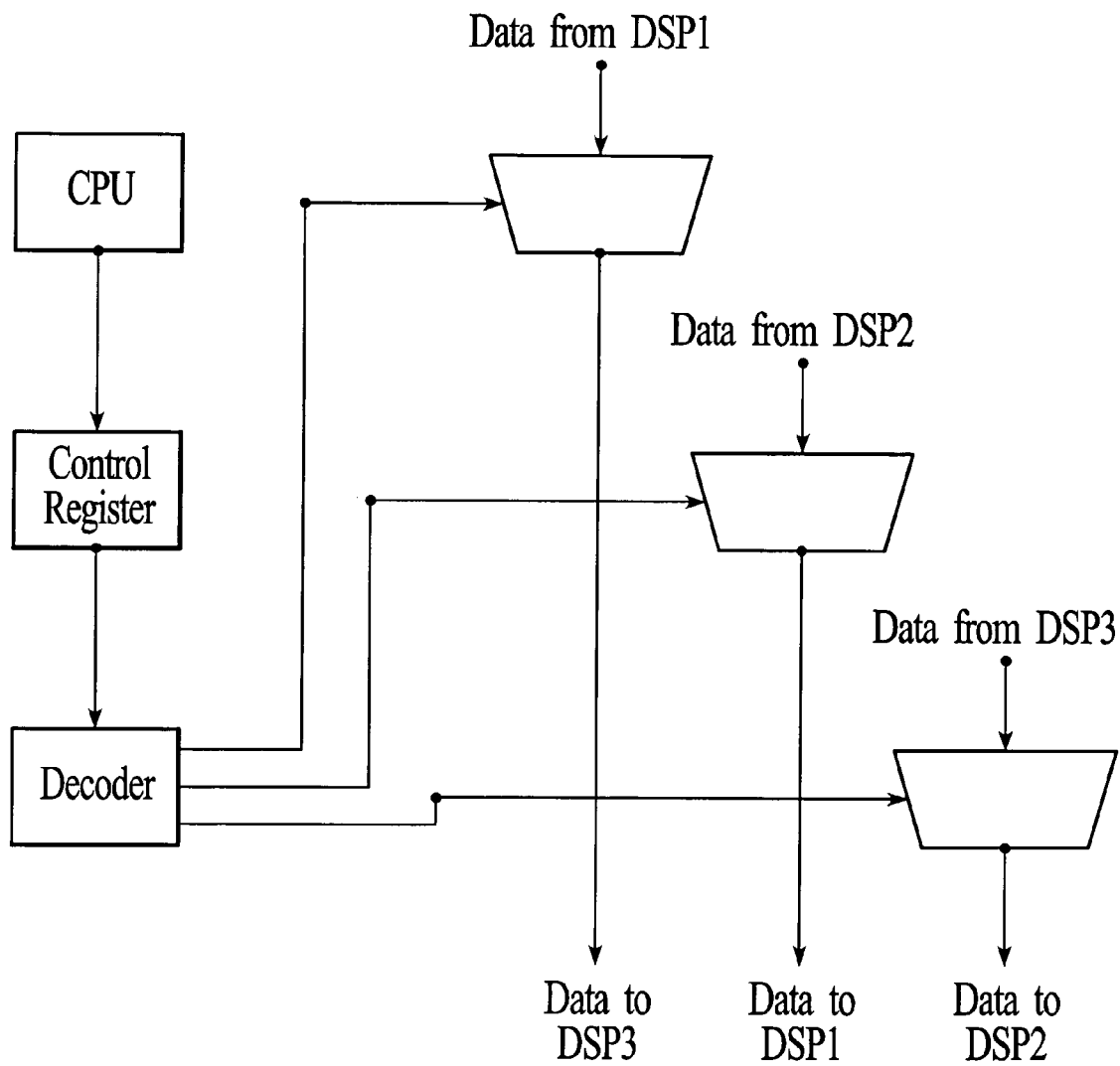
FIG. 16 illustrates a block diagram of the DSP load management system parallel word transfer in accordance with the preferred embodiment of the present invention.

FIG. 16 illustrates a block diagram of the DSP load management system parallel word transfer in accordance with the preferred embodiment of the present invention. The DLMS includes a decoder capable of decoding CPU instructions that require parallel data word transfers between DSPs and between DSPs and memories. Data from DSP1 can be sent to a first decoder and after decoding sent to the DSP31. Likewise, data from DSP2 can be sent to a second decoder and after decoding sent to the DSP1. Further, data from DSP3 can be sent to a third decoder and after decoding sent to the DSP2. The process is based on decoding of CPU instruction containing an opcode or a bit set by the CPU in the control registers of the DLMS. This process can be performed simultaneously with multiple DSPs.

Figure 17:
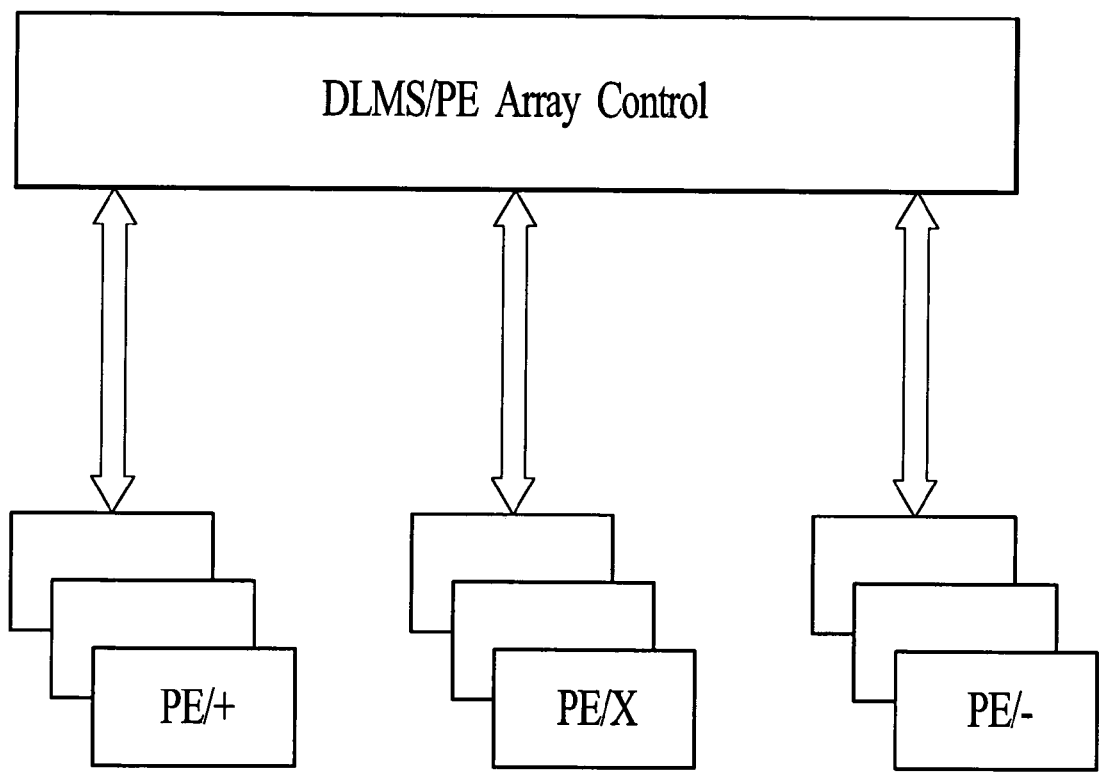
FIG. 17 illustrates a block diagram of the PE array controller in accordance with the preferred embodiment of the present invention.

FIG. 17 illustrates a block diagram of the PE array controller in accordance with the preferred embodiment of the present invention. Referring back to FIG. 9A, the DLMS/PE arrays can be substituted for one or more DSP array 144a, 144b, 144c. In this manner, the DLMS/PE array is a smaller array having less captive memory. Subroutines are fed in parallel to the PE/+ addition, PE/× multiply, and PE/− subtraction through internal registers in the DLMS. After performing the subroutines using the PE/+, PE/×, and PE/−, the data is sent back to the DLMS/PE array.

Figure 18A:
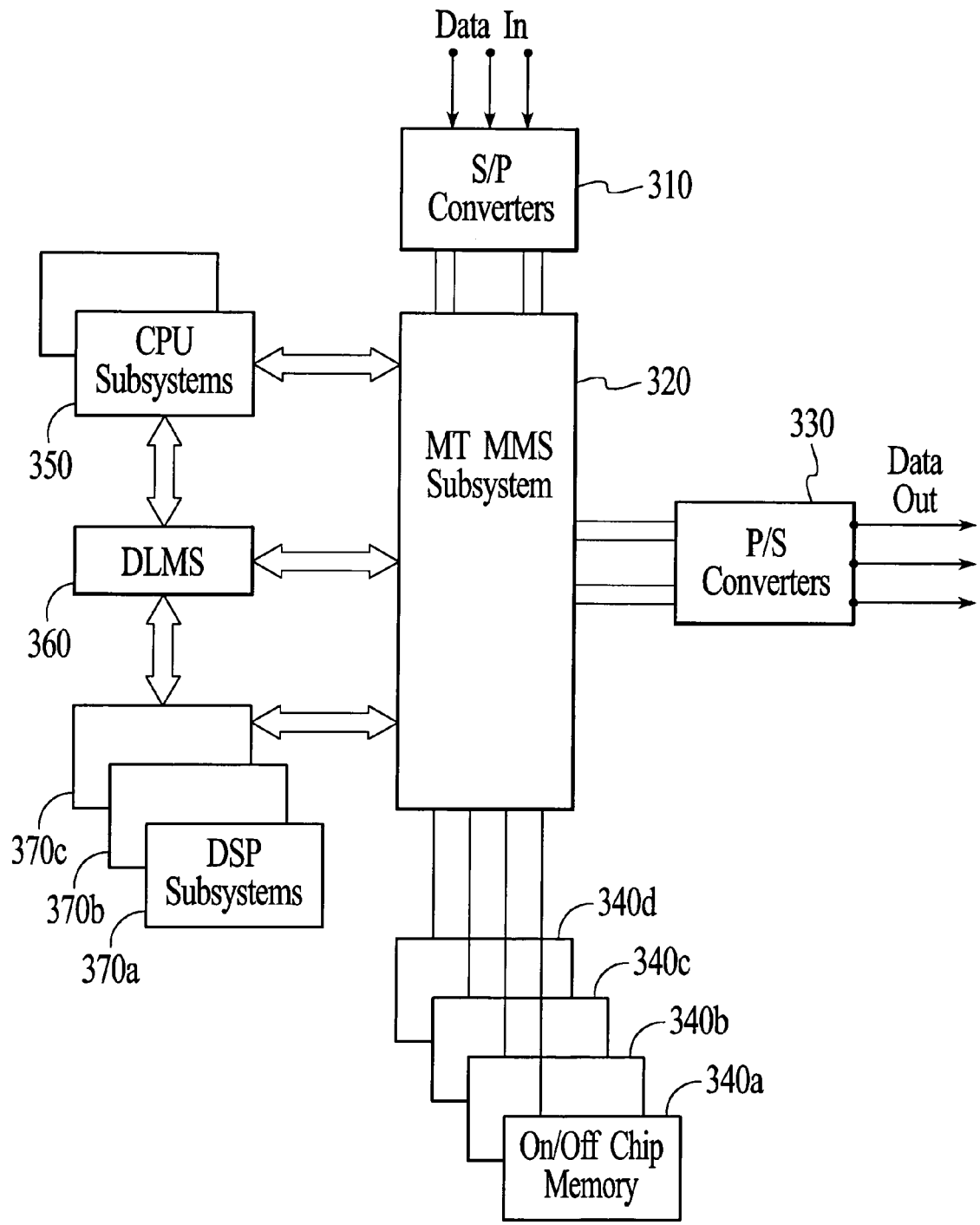
FIGS. 18A–18C illustrate a system having a configurable bridge/gateway for optical networks in accordance with the preferred embodiment of the present invention.
Figure 18B:
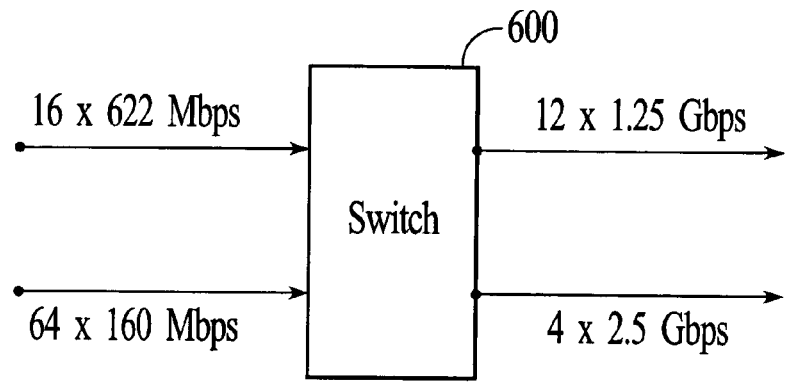
Figure 18C:
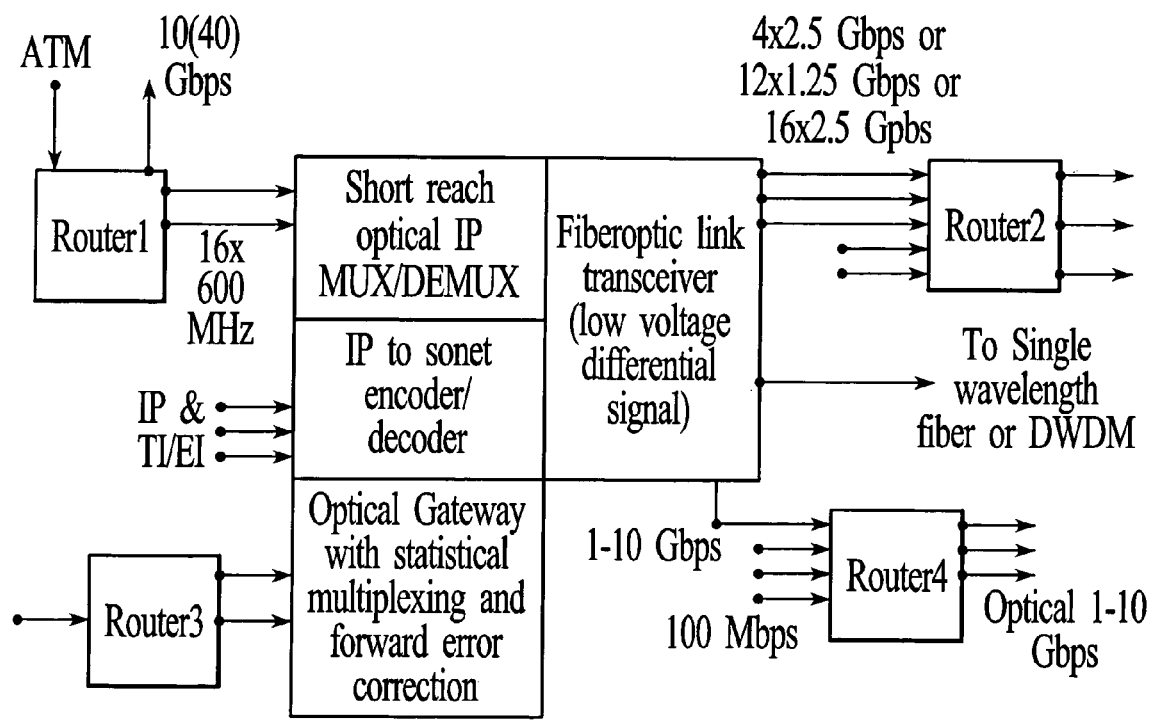

FIGS. 18A–18C illustrate a system having a configurable bridge/gateway and/or switching functionality for optical networks in accordance with the preferred embodiment of the present invention. FIG. 18A illustrates a configurable bridge/gateway for an optical network using the DLMS and MT MMS. The MT MMS 320 communicates with CPU subsystems 350, DLMS 360 and DSP subsystems 370a, 370b, 370c. In addition, the MT MMS communicates with on/off chip memories 340a, 340b, 340c, 340d, and the DLMS 360 is interfaced between the CPU subsystems 350 and DSP subsystems 370a, 370b, 370c. When data is inputted into the system, the S/P converter 310 converts the data, whose rate is preferably between 0.5–2.5 Gbps. After the converted data enters the MT MMS, it is processed appropriately, as discussed above, and then sent out via the P/S converters 330 at a rate that is preferably between 0.5–2.5 Gbps. FIG. 18B illustrates the switching rates compatible with the present invention. Data can be inputted at a rate of 16×622 Mbps or 64×160 Mbps to the switch 600. Thereafter, the data is outputted using the switch 600 at a rate of 12×1.25 Gbps or 4.×2.5 Gbps.

FIG. 18C illustrates a more detailed diagram of the configurable bridge/gateway in accordance with the preferred embodiment of the present invention as shown in FIG. 18A containing a multi-threaded memory access controller, MT-MMS, DLMS, CPU and DSPs. Router 1 and router 3 can input data into the bridge/gateway before such data is inputted in router 2 and router 4. This short reach (i.e., same "campus") bridge is used to interface between routers using low cost fiber and laser system. The DSP systems can be used for forward error correction and IP to Sonet encoding. As illustrated, the bridge/gateway includes functionalities such as optical IP MUX/DEMUX, IP to Sonet Encoder/Decoder, Optical gateway with statistical multiplexing, and fiberoptic link transceiver. These functionalities allow data from ATM, IP, T1/E1 to be transmitted to the router 2 and router 4 at higher data rates. This allows conversion from IP to sonet. Routers break down the data into smaller frequencies and the switch allows the routers to communicate with each other.

In the previous descriptions, numerous specific details are set forth, such as specific functions, components, etc., to provide a thorough understanding of the present invention. However, as one having ordinary skill in the art would recognize, the present invention can be practiced without resorting to the details specifically set forth.

Although only the above embodiments have been described in detail above, those skilled in the art will readily appreciate that many modifications of the exemplary embodiments are possible without materially departing from the novel teachings and advantages of this invention.

I claim:

1. A system for providing parallel processing of data to a plurality of digital signal processors (DSPs), comprising:

means for transmitting communication data to a load management system from at least one CPU, wherein the load management system includes:

a plurality of direct memory access (DMA) devices, each DMA device having one or more internal registers, one or more FIFOs, and a state machine associated with the one or more FIFOs;

a memory interface for interfacing the plurality of DMA devices with an external memory device;

a plurality of status and control registers coupled to the plurality of DMA devices;

at least one CPU interface for interfacing the at least one CPU with the plurality of status and control registers; and a plurality of DSP interfaces for interfacing the plurality of DSPs with the plurality of DMA devices, wherein each of the plurality of DSP interfaces includes a program/data memory and a ping pong memory;

an external memory, wherein the external memory is coupled to the plurality of DSPs through a plurality of dedicated memory threads;

means for selecting two or more DSPs from the plurality of DSPs for processing the communication data using the load management system;

means for processing the communication data using the selected two or more DSPs and the load management system; and means for transmitting the processed communication data back to the at least one CPU and to a communication device, wherein the at least one CPU interface includes at least one routing MUX, wherein the at least one routing MUX is coupled to the external memory device.

2. The system of claim 1, wherein the communication data is transmitted from a VoIP system.

3. The system of claim 1, wherein the communication data is transmitted from a FoP system.

4. The system of claim 1, wherein the communication data is transmitted from an IP to sonet system.

5. The system of claim 1, wherein the communication data is transmitted from an encoder/decoder.

6. The system of claim 1, wherein the communication data is transmitted from a broadband communication system.

7. The system of claim 1, wherein the communication data is transmitted from an image processing system.

8. The system of claim 1, wherein the communication data is transmitted from a data modem.

9. The system of claim 1, wherein the external memory device comprises a memory access controller array.

10. The system of claim 1, wherein the external memory device comprises a memory management system.

11. A computer implemented method for providing parallel processing of data to a plurality of digital signal processors (DSPs), comprising the steps of:

transmitting communication data to a load management system from at least one CPU, wherein the load management system includes:

a plurality of direct memory access (DMA) devices, each DMA device having one or more internal registers, one or more FIFOs, and a state machine associated with the one or more FIFOs;

a memory interface for interfacing the plurality of DMA devices with an external memory device;

a plurality of status and control registers coupled to the plurality of DMA devices;

at least one CPU interface for interfacing the at least one CPU with the plurality of status and control registers; and a plurality of DSP interfaces for interfacing the plurality of DSPs with the plurality of DMA devices, wherein each of the plurality of DSP interfaces includes a program/data memory and a ping pong memory;

coupling an external memory to the plurality of DSPs through a plurality of dedicated memory threads;

selecting two or more DSPs from the plurality of DSPs for processing the communication data using the load management system;

processing the communication data using the selected two or more DSPs and the load management system; and transmitting the processed communication data back to the at least one CPU and to a communication device, wherein the at least one CPU interface includes at least one routing MUX, wherein the at least one routing MUX is coupled to the external memory device.

* * * * *